(12) United States Patent
Abedin

(10) Patent No.: US 6,738,408 B2
(45) Date of Patent: May 18, 2004

(54) MODE-LOCKED LASER APPARATUS

(75) Inventor: Kazi Sarwar Abedin, Cambridge, MA (US)

(73) Assignee: Communications Research Laboratory, Independent Administrative Institution, Koganei (JP)

(*) Notice: Subject to any disclaimer, the term of this patent is extended or adjusted under 35 U.S.C. 154(b) by 35 days.

(21) Appl. No.: 09/805,924

(22) Filed: Mar. 15, 2001

(65) Prior Publication Data

US 2002/0044574 A1 Apr. 18, 2002

(30) Foreign Application Priority Data

Sep. 11, 2000 (JP) .......................................... 2000-275718

(51) Int. Cl.[7] .............................. H01S 3/113; H01S 3/10
(52) U.S. Cl. ............................... 372/94; 372/11; 372/26
(58) Field of Search ................................ 372/94, 11, 26

(56) References Cited

U.S. PATENT DOCUMENTS

| | | | |
|---|---|---|---|
| 5,274,659 A | | 12/1993 | Harvey et al. |
| 5,590,142 A | | 12/1996 | Shan |
| 5,975,697 A | * | 11/1999 | Podoleanu et al. ......... 351/206 |
| 6,198,568 B1 | * | 3/2001 | Galvanaukas et al. ...... 359/332 |
| 6,289,740 B1 | * | 9/2001 | Posey et al. ................. 73/800 |

OTHER PUBLICATIONS

K. S. Abedin, et al., "154 GHz Polarisation–Maintaining Dispersion–Managed Actively Modelocked Fibre Ring Laser," Electronic Letters, vol. 36, No. 14, Jul. 6, 2000, pp. 1185–1186.

K. S. Abedin, et al., "Actively Mode–Locked Erbium Fiber Laser Generating 154–GHz Repetition Rate, 1.1–ps Transform–Limited Pulse Train," Fifth Optoelectronics and Communications Conference (OECC 2000) Technical Digest, Jul. 10–14, 2000, pp. 18–19.

Repetition–rate multiplication in actively mode–locked fiber lasers by higher–order FM mode locking using a high–finesse Fabry–Perot filter, Abedin, Appl. Phys. Lett., vol. 73, No. 10 Sep. 7, 1998, pp. 1311–1313.

Overcoming the repetition–rate–limitation imposed by the free spectral range of the Fabry–Perot filter used in higher-order FM modelocked lasers, Abedin, Electronics Letters, vol. 34, No. 23, Nov. 12, 1998, pp. 1–2.

Generation of a 64–GHz, 3.3–ps transform–limited pulse train from a fiber laser employing higher–order frequency-modulated mode locking, Abedin, Optics Letters, vol. 24, No. 22, Nov. 15, 1999, pp. 1564–1567.

Stabilising Er Fibre Solution Laser with Pulse Phase Locking, Shan, Electronics Letters, vol. 28, No. 2, Jan. 16, 1992, pp. 182–184.

* cited by examiner

*Primary Examiner*—Eddie Lee
*Assistant Examiner*—Joseph Nguyen
(74) *Attorney, Agent, or Firm*—Oblon, Spivak, McClelland, Maier & Neustadt, P.C.

(57) ABSTRACT

A mode-locked laser apparatus includes a mode-locked laser oscillator, a detection device for detecting changes in the optical path length of the mode-locked laser oscillator by utilizing the chromatic dispersion characteristics of the optical path, an optical path length controller that controls the optical path length of the laser oscillator, and a feedback circuit that controls the optical path length controller by means of the signal detected by the detection device.

36 Claims, 17 Drawing Sheets

(a)

(b)

(a)

(b)

(a)

(b)

(c)

MODE-LOCKED LASER APPARATUS

BACKGROUND OF THE INVENTION

1. Field of the Invention

This invention relates to a mode-locked laser apparatus that generates an ultra-high-speed light pulse train with a stable repetition rate such as that required for high-capacity communication systems and the like, and particularly to a mode-locked laser apparatus that uses the chromatic dispersion characteristics of the optical path to generate a feedback signal and adjusts the length of the optical path using this signal.

2. Description of the Prior Art

Pulse generators having a high repetition rate and that are optical sources with a uniform repetition rate that can be synchronized to an external clock signal are important in the field of optical communication. Recently, by adapting mode-locking techniques to fiber lasers, research into generating such high-repetition pulse trains has become active.

A known method of generating pulses by mode locking is the method of installing an intensity modulator or phase modulator in a ring laser oscillator and modulating the intensity or phase of the light passing through the modulator. At this time, the modulation frequency $f_m$ required to achieve the optimal mode locking can be expressed by the following Equation 1.

$$f_m = N \cdot \left(\frac{c}{nL}\right) = N \cdot f_r \quad (1)$$

Here, c is the speed of light, n is the index of refraction of the optical fiber, L is the length of the optical path of the oscillator, $f_r$ (=c/nL) is the fundamental repetition rate of the laser, and N is a positive integer. When $f_m$ and $f_r$ have the aforementioned relationship, a periodic light pulse is generated from the laser and the repetition rate of the pulse becomes the same as the modulation frequency $f_m$. While one pulse is present within the oscillator in the case of N=1, N pulses are present at equal intervals in the case of N>1. Typically, $f_r$ is between several hundred kHz and several dozen MHz. For this reason, in order to generate a pulse train with a repetition rate in the GHz band required for optical communications, mode locking is performed by modulation in the state N>>1. Mode locking in the case of N>1 in this manner is typically called harmonic mode locking.

In order to increase the repetition rate of mode-locked pulses, from the above explanation it can be seen that it is sufficient to increase the modulation frequency. However, the modulation frequency has an upper limit given by the bandwidth of the modulator or the radiofrequency (RF) oscillator that generates the modulation signal. In passing, optical modulators with a frequency bandwidth of 40 GHz have recently become commercially available and there are reports of them being used to generate 40-GHz mode-locked pulses by mode locking.

In addition, higher-order mode locking methods that exceed the bandwidth of the modulator and RF oscillator and the like in order to increase the repetition rate of the optical pulses have been proposed in Reference 1 (K. S. Abedin, N. Onodera and M. Hyodo, "Repetition-rate multiplication in actively mode-locked fiber lasers by higher-order FM mode locking using a high-finesse Fabry-Perot filter," Applied Physics Letters, Vol. 73, No. 10, pp. 1311–1313, 1998), Reference 2 (K. S. Abedin, N. Onodera and M. Hyodo, "Overcoming the repetition-rate-multiplication imposed by free-spectral-range of the Fabry-Perot filter used in higher-order FM mode-locked lasers," Electronics Letters, Vol. 34, No. 23, pp. 2264–2265) and Reference 3 (K. S. Abedin et al., "Generation of a 64-GHz, 3.3-ps transform-limited pulse train from a fiber laser employing higher-order frequency-modulated mode locking," Optics Letters, Vol. 24, No. 22, pp. 1564–1566 (1999).) and the like. By means of any one of the above methods, a pulse train with a repetition rate of an integral multiple of the modulation frequency can be generated from a mode-locked laser, so the realization of a higher-order mode-locked laser pulse generator that exceeds the bandwidth limit due to the modulator as above became possible.

FIG. 1 shows one example of such a higher-order mode-locked laser pulse generator. The apparatus shown in FIG. 1 consists primarily of an optical fiber amplifier doped with rare-earth elements (hereinafter referred to as a "rare-earth-doped fiber amplifier") 101, optical filter 102, polarization controller 103, optical splitter 104, optical modulator 105, optical isolator 106, Fabry-Perot filter 107, electrical (RF) oscillator 108, amplifier 109 and temperature controller 110.

The rare-earth-doped fiber amplifier 101 consists mainly of an optical fiber doped with a rare-earth element, a pump source which excites the fiber, an optical coupler and an optical isolator. This amplifier is connected in the form of a loop via the optical filter, polarization controller, optical modulator, optical isolator and Fabry-Perot filter, thereby forming a laser resonator 100.

The aforementioned higher-order mode-locked laser is characterized in that, in contrast to an ordinary mode-locked laser, a Fabry-Perot filter is installed within the resonator, and the modulation frequencies and characteristics of the Fabry-Perot filter or particularly the free spectral range (FSR) are set such that the excitation modes of the optical spectrum overlap with specific ones of the periodic pass spectra of the filter. More specifically, the conditions for performing higher-order (K-order) mode locking can be expressed by the following Equation 2.

$$K \cdot f_m = Q \cdot FSR = f_o \quad (2)$$

Here, Q and K are positive integers with a mutually prime relationship with respect to each other and thus have no common prime factors. For example, Q=1, K=4; or Q=2, K=5. In Equation 2, $f_m$ is the modulation frequency and $f_o$ is the pulse repetition rate.

Also in order to perform higher-order mode locking, as in Equation 1, the modulation frequency must be selected as an integral multiple of the fundamental repetition rate $f_r$ of the resonator. Moreover, if the relationship between the FSR of the Fabry-Perot filter and the modulation frequency is as in Equation 2, a mode-locked pulse train is generated at a repetition rate K times the modulation frequency $f_m$ ($f_o$=K·$f_m$=Q·FSR).

By using a Fabry-Perot filter with an FSR having a relationship with the modulation frequency such as that in Equation 2, in contrast to the case of ordinary mode locking wherein mode locking is applied by means of first-order modulation sidebands of modulation, in a higher-order mode-locked laser, K-order modulation sidebands are involved in mode locking. As a result, the repetition rate of pulses can be made to be K times the modulation frequency. Reference 3 above reports a technique whereby phase modulation is performed at 16 GHz and a Fabry-Perot filter with an FSR of 64 GHz is used (Q=1, K=4) to generate a pulse train with a repetition rate of 64 GHz. As another example, Reference 2 above reports an example wherein phase modulation is performed at a frequency of 5.79 GHz and a Fabry-Perot filter with an FSR of 3.48 GHz is used to generate a pulse train with a repetition rate of 17.4 GHz. In this case, Q=5 and K=3.

As described above, by performing higher-order mode locking, it is possible to generate pulse trains with a high repetition rate that was not possible with ordinary mode locking. For example, if fourth-order mode locking is performed using a 40-GHz phase modulator which has the broadest bandwidth commercially available and a Fabry-Perot filter with an FSR of 160 GHz, it is expected that a pulse train can be generated with a repetition rate of 160 GHz.

However, with a conventional higher-mode mode-locked laser pulse generator as described above, there are problems in that when pulses are generated over a long period of time, the length of the optical path of the resonator changes due to expansion or changes in the optical characteristics due to changes in the temperature of the constituent members, or when used in a vibrating environment, the optical path length changes due to vibration of components, and thus changes in the fundamental repetition rate $f_r$ occur and so the conditions for mode locking given in Equation 1 are not satisfied over long periods of time. To wit, with a conventional higher-order mode-locked laser pulse generator, the optical path length of the resonator changes particularly due to increases in the temperature of the optical fiber, so divergence occurs between the external modulation frequency and the fundamental repetition rate and thus mode locking is not easily achieved. As a result, there is a problem in that the width of pulses in the laser resonator and the spectral characteristics vary over time.

Here follows a description of just how much divergence occurs in the harmonic frequencies between the external modulation frequency and the fundamental repetition rate when the temperature of the interior of the laser resonator varies by $\Delta t$. Taking the change in the length of the optical fiber to be $\Delta L$ when the temperature change is $\Delta t$, while $\Delta t$ and $\Delta L$ are both minute, they can be assumed to have the following proportional relationship.

$$\frac{\Delta L}{L} = \alpha \cdot \Delta t \tag{3}$$

Here, L is the optical path length of the laser resonator prior to the temperature change and $\alpha$ is the coefficient of linear thermal expansion of the optical fiber.

Assuming the modulation frequency prior to the temperature change to be $f_m$ (=N·$f_r$), the divergence $\Delta f$ between the modulation frequency in optimal mode locking and the actual modulation frequency is as follows.

$$\Delta f = f_m \cdot \frac{\Delta L}{L} = f_m \cdot \alpha \cdot \Delta t \tag{4}$$

If the temperature of the interior of the resonator varies by 0.1° C. for example, assuming L=50 m, $f_m$=40 MHz and $\alpha=10^{-5}$, based on Equation 3 and Equation 4, this gives $\Delta L$=50 µm and $\Delta f$=40 kHz.

In this manner, an increase in the temperature of the resonator causes changes in the optical path length, so the fundamental repetition rate of the laser changes. In order to prevent this, known methods of stabilizing an ordinary mode-locking laser (in this case, the pulse repetition rate $f_o$=modulation frequency $f_m$) include: 1) the pulse phase locking method and 2) the method of performing stabilization using a Fabry-Perot filter. These are described below.

1) Pulse Phase Locking:

Shan, et al. reported in Reference 4 (Shan, et al., "Stabilizing Er fiber soliton laser with pulse phase locking," X. Electronics Letters, Vol. 28, No. 2, pp. 182–184, 1992) regarding a method of stabilizing a mode-locked laser.

FIG. 2 shows a laser apparatus based on this stabilization method. In the apparatus of FIG. 2, an erbium-doped optical fiber 201, modulator 205, polarization controller 203, optical splitter 204 and optical isolator 206 are connected in a ring using optical fiber, thus forming a resonator. In addition, in order to generate the optical soliton effect, an optical fiber with a stepped index of refraction (step index fiber) 202 is installed. In addition, the erbium-doped optical fiber is wound around a piezoelectric transducer (PZT) 214, and this piezoelectric transducer (PZT) 214 constitutes a portion of a feedback circuit for performing stabilization.

In this feedback circuit, a portion of the output laser pulse light is provided as input to an optical detector 215, and the electrical pulse signal thus obtained is amplified using an amplifier 211 and passed through a narrow bandpass filter 212. Thus, sinusoidal electrical signal components with the same frequency as the modulation frequency are extracted. Moreover, the phase difference between these sinusoidal signals and the electrical signals that drive the modulator is detected using a mixer 213, and this phase-difference signal is used as an error signal for the feedback circuit. This signal is amplified with a high-voltage amplifier and applied to the PZT which exhibits the piezoelectric effect, thereby deforming the PZT. To wit, by adjusting the voltage applied to the PZT, the length of the erbium-doped optical fiber wrapped around the PZT is adjusted, thereby applying compensation which cancels out the change in the optical path length of the resonator due to the temperature change. Since the optical path length of the laser resonator can be kept constant in this manner, stable operation is possible.

The aforementioned method is extremely effective in the stabilization of a mode-locked laser, but in order to implement this method, as is evident from the aforementioned description, the optical detector 215, amplifier 211, narrow bandpass filter 212 and mixer 213 must operate within the bandwidth of the pulse repetition rate. In particular, optical detection becomes difficult in the region wherein the pulse repetition rate is 100 GHz or greater, and moreover, the amplifier, bandpass filter and mixer are expensive, thus leading to increased manufacturing costs.

Moreover, when higher-order mode locking is performed, since the repetition rate of the pulses generated by the laser and the frequency of signals from the oscillator are not the same (K versus 1), additional effort is required for the generation of the error signal so it is clear that it cannot be applied to a higher-order mode-locked laser as is like above.

2) Method of Performing Stabilization Using a Fabry-Perot Filter

A stabilization method for performing the stabilization of an ordinary harmonic mode-locked laser (in this case, the pulse repetition rate $f_o$=modulation frequency $f_m$) without requiring high-bandwidth detectors, amplifiers, bandpass filters or other RF elements is recited by George T. Harvey in Reference 5 (Japanese Patent No. 2724278) and Reference 6 (U.S. Pat. No. 5,274,659).

FIG. 3 shows the constitution of such a laser apparatus. This laser consists of an erbium amplifier 15, optical couplers 13 and 27, pump laser 14, isolator 28, modulator 18, polarization controller 17, electronic oscillator 19, Fabry- Perot resonator 24, length adjustment apparatus 32 and a single-mode optical fiber 12 connected in a loop.

In the length adjustment apparatus 32, beam 33 and beam 34 are derived from the laser optical path. Next, these beams 33 and 34 are directed through a single wedged etalon 37, and disposed such that they pass through a first or second filter constituted differently depending on the location used. In addition, a beam 35 which constitutes part of the ring laser resonator is constituted such that it passes through a portion of the etalon intermediate to those where beam 33 and beam 34 pass. A differential amplifier 42 detects the difference in the light intensity detected by detectors 39 and 40 and an optical path length adjustment device 43 adjusts the length of the ring laser optical path, thereby compensating for fluctuations in the length of the optical path due to changes in the laser temperature.

In the aforementioned apparatus, the Fabry-Perot resonator 24 is detuned or deviated slightly from its frequency determined by the modulation frequency for the purpose of permitting an error signal to be generated that can be used to compensate for small changes in the length of the optical path of the closed-loop ring of the laser. In FIG. 4(a), the Fabry-Perot resonator has been detuned such that the FSR deviates from a frequency exactly equal to the pulse repetition rate by a frequency equal to df. This amount of detuning df required to perform stabilization is smaller than the fundamental repetition rate $f_n$ or namely $df < f_n$ and this is one of the characteristics of this method. By slightly detuning the Fabry-Perot resonator in this manner, a small change in the length of the ring can be detected as an electrical signal through changes in the wavelength or frequency of output light, as described below.

As shown in FIG. 4(b), if a small change in the length of the optical path causes the ring mode $M_2$ of Fabry-Perot mode $R_4$ determined by the length of the optical path of the closed-loop ring of the laser to move slightly to the right, the transmission intensity at that frequency is greatly reduced, whereas the same change moves the corresponding ring mode $M_2$ of Fabry-Perot mode $R_3$ to a region of maximum output. The consequence of this is that the small change results in a large increase in the intensity of frequencies defined by mode $R_3$ and a reduction of those in mode $R_5$. In addition, a change in ring length that would have caused $M_2$ to move in the opposite direction will cause a predominant shift of frequencies to those defined by Fabry-Perot resonant-mode $R_5$. Thus, movements of $M_2$ within resonator $R_4$ to the right cause the light intensity in mode $R_3$ to increase, and movements of $M_2$ within $R_4$ to the left cause the intensity of light in $R_5$ to increase relative to the other Fabry-Perot modes R. Small changes in optical path length are thereby manifested as detectable changes in output frequency, thereby changing the spectral intensity distribution. This spectral intensity distribution can be detected as follows.

FIG. 3 shows apparatus 32 for detecting a change of frequency of the light transmitted in the ring laser resonator and automatically making the adjustment of the optical path length of the ring in response to such frequency deviation. Beam splitters are used for deriving from the optical path two optical beams 33 and 34. Here, a beam portion 35 constitutes part of the optical path of the ring. The three beam portions 33, 34 and 35 all constitute the optical path including the wedged etalon 37. This etalon 37 may be a body of quartz tapered as shown. Here, beam 33 is transmitted through a relatively thinner portion of the etalon, while beam 34 is transmitted through a relatively thicker portion.

Next, referring to FIG. 5, we shall describe the effects of this apparatus 32. FIG. 5 shows differences in characteristics depending on the position of the wedged etalon. This etalon constitutes an optical filter for each of the three beams. These characteristics, as shown in FIG. 5, are curve 55 representing the optical pass-band for beam 35, curve 54 representing the pass-band for optical beam 34, and curve 53 being the pass-band for beam 33. The intersection C of pass-bands 54 and 53 at frequency $f_c$ indicates that they are symmetrical with respect to $f_c$. In addition, the intensities of beams 33 and 34 are detected by detectors 39 and 40, and since pass-bands 55 and 54 are frequency dependent, changes in optical frequency are manifested by changes of optical intensity detected by detectors 39 and 40. The outputs of the detectors are input to a differential amplifier 42 and the differential amplifier 42 output is input to an optical path length adjustment device 43. As described above, the length adjustment device 43 adjusts the length of the optical path of the ring laser based on the signals that detect changes in the optical path length due to temperature changes or the like, such that it is equivalent to being constant.

From the foregoing, it can be appreciated that slight detuning the Fabry-Perot resonator 24 of FIG. 3 can be quite effective in generating a difference voltage from differential amplifier 42 as needed for compensating for length changes. That is, as shown in FIGS. 4(a) and 4(b), a small change in the length of the optical path gives a large change in the intensity of resonator modes $R_3$ and $R_5$, and this large change in intensity in turn is converted to an electrical signal which is amplified by the difference amplifier, thus driving the optical path length controller. Here, in the absence of the detuning depicted in FIGS. 4(a) and 4(b), the change in the length of the optical path of the ring resonator could not be expected to generate a difference signal for making a length adjustment.

A drawback of this method is the problem that, if the bandwidth BW of the Fabry-Perot filter becomes much larger than the fundamental repetition rate $f_r$ of the laser, namely in the case of $BW \gg f_n$ it does not work well. The reason for this is described below.

In the case of $BW \gg f_n$ the relationship between the Fabry-Perot modes $R_n$ and the oscillator modes and oscillator vertical modes may be illustrated in FIG. 15, for example. FIG. 15 shows an example wherein the bandwidth $BW = 10 \times f_r$ and $FSR = f_m - df$. While mode $M_2$ indicated by the solid line is the generated mode, the modes indicated by dashed lines indicate the positions of vertical modes near $M_2$ at which generation is suppressed. According to the conventional Fabry-Perot based stabilization method described in Reference 5 above, the amount of detuning df for generating the error signal must be selected to be a value smaller than $f_r$ ($df < f_r$). However, the case shown in FIG. 15, even if the mode $M_2$ moves to the right or left due to temperature changes, the amount of this movement is smaller than the bandwidth BW, so as shown in FIG. 4, it is difficult to obtain as a fluctuation in intensity of a level that can be detected.

In the preferred embodiment of Reference 5, the frequency separation between modes of the resonator is $f_r=7$ MHz, the width of each Fabry-Perot mode R is 16 MHz, the FSR is approximately 2.5 GHz, and the detuning frequency df is roughly 100 kHz. Therefore, the relationship between the filter bandwidth BW and the fundamental repetition rate $f_r$ is $BW/f_r=2.3$, so it can be seen that this is an extremely small value. In addition, since FSR is roughly the same as the modulation frequency, the finesse of the filter (=FSR/BW) is a value close to $f_m/BW$. If the modulation frequency is raised (for example, when $f_m$=40 GHz), the value of the finesse required in the aforementioned laser structure becomes 2500. The manufacture and use of a Fabry-Perot filter having such a high finesse is difficult in practice.

Moreover, in order for the apparatus to operate stably, $f_m$ must be set in the range $FSR-f_r<f_m<FSR+f_r$ but there is a problem in that the modulation frequency or pulse repetition rate cannot be changed by $2\times f_r$ or greater.

Conventional stabilized mode-locked lasers have the following problems.

In the pulse phase locking method 1) above, the optical detector 215, amplifier 211, narrow bandpass filter 212 and mixer 213 included in the feedback circuit must operate within the bandwidth of the pulse repetition rate. However, optical detection becomes difficult when the pulse repetition rate is 100 GHz or greater, and moreover, the amplifier, bandpass filter and mixer are expensive, thus increasing manufacturing costs.

Moreover, when higher-order mode locking is performed with this method, since the repetition rate of the pulses generated by the laser and the frequency of signals from the oscillator are not the same (K versus 1), additional effort is required for the generation of the error signal so it is clear that it cannot be applied to a higher-order mode-locked laser as is like above.

In the method of performing stabilization using a Fabry-Perot filter 2) above, there is the problem in that if the bandwidth BW of the Fabry-Perot filter becomes much larger than the fundamental repetition rate $f_r$ of the laser (BW>>$f_r$) it does not work well. In order to generate pulses stably at a repetition rate of several dozen GHz or 100 GHz or greater, the BW of the Fabry-Perot filter must be selected at roughly $f_r$ and one with an extremely large finesse is required, so there are problems with manufacture and use, and the cost also becomes high.

Moreover, an additional drawback of this method is the problem that it is difficult to apply to lasers that oscillate at a plurality of modes with adjacent frequencies. This is because when the signal serving as the basis is positioned between a plurality of adjacent modes, a feedback signal cannot be obtained or is difficult to obtain.

The present invention has come about in consideration of the above problems. One object thereof is to provide a mode-locked laser apparatus that, while being a higher-order mode-locked laser that is able to generate pulses with a high repetition rate, is also able to perform frequency-stabilized pulse generation over long periods of time without using wide-bandwidth components.

SUMMARY OF THE INVENTION

In order to achieve the aforementioned object, the present invention provides a mode-locked laser apparatus comprising: a mode-locked laser oscillator, detection means for detecting changes in length of an optical path of the mode-locked laser oscillator by utilizing chromatic dispersion characteristics of the optical path, an optical path length controller that controls the length of the optical path of the laser oscillator, and a feedback circuit that controls the optical path length controller by means of a signal detected by the detection means.

The invention further provides a mode-locked laser apparatus comprising: a mode-locked laser oscillator, an optical modulator, a signal generator that moves the optical modulator with a modulation signal with a constant frequency, an optical filter, an optical isolator, detection means for detecting changes in length of an optical path of the mode-locked laser oscillator by utilizing chromatic dispersion characteristics of the optical path, an amplifier that amplifies an output signal obtained from the detection means, an optical path length controller that controls the length of the optical path of the laser oscillator, and a feedback circuit that controls the optical path length controller by means of the output signal amplified by the amplifier.

The invention additionally provides a mode-locked laser apparatus comprising: a mode-locked laser oscillator, an optical modulator that modulates light output from the laser oscillator with a modulation signal, filter means that selects sidebands equivalent to harmonics of the modulation signal contained in the light modulated by the optical modulator, an optical isolator, detection means for detecting changes in length of an optical path of the mode-locked laser oscillator by utilizing chromatic dispersion characteristics of the optical path, an amplifier that amplifies an output signal obtained from the detection means, an optical path length controller that controls the length of the optical path of the laser oscillator, and a feedback circuit that controls the optical path length controller by means of the output signal amplified by the amplifier.

The mode-locked laser apparatus just mentioned above, wherein a modulation frequency of the optical modulator and a free spectral range of the filter means have relationship of being equal to each other when one of the modulation frequency and the free spectral range is multiplied by one of two mutually prime positive integers K and Q and the other multiplied by the other integer, and wherein the filter means has a combination in which the positive integers K and Q are present such that a ratio K/Q is a value below a finesse of a Fabry-Perot filter, can further comprises: a first construction for extracting from the output light two spectral frequency components at roughly equal distances in frequency from a center frequency of an oscillation spectrum of the output light, one on a long-frequency side and the other on a short-frequency side, a second construction for using two photodetectors to detect an average intensity of each of the two frequency components extracted by the first construction, means of deriving an intensity-difference signal for two signals detected by the second construction, and a construction for controlling the optical path length controller in accordance with the intensity-difference signal, and wherein a pulse train is generated at a repetition rate that is the same as the modulation frequency.

The invention additionally provides a mode-locked laser apparatus comprising: a mode-locked laser oscillator, an optical modulator that modulates light output from the laser oscillator with a modulation signal, detection means for detecting changes in length of an optical path of the mode-locked laser oscillator by utilizing chromatic dispersion characteristics of the optical path, an amplifier that amplifies an output signal obtained from the detection means, an optical path length controller that controls the length of the optical path of the laser oscillator, and a feedback circuit that controls the optical path length controller by means of the output signal amplified by the amplifier.

The mode-locked laser apparatus just mentioned above can further comprises: a first construction for extracting from the output light two spectral frequency components at roughly equal distances in frequency from a center frequency of an oscillation spectrum of the output light, one on a long-frequency side and the other on a short-frequency side, a second construction for using two photodetectors to detect an average intensity of each of the two frequency components extracted by the first construction, means of deriving an intensity-difference signal the two signals detected by the second construction, and a third construction for controlling the optical path length controller in accordance with the intensity-difference signal, and wherein a pulse train is generated at a repetition rate that is the same as the modulation frequency.

Any one of the aforementioned mode-locked laser apparatus can further comprise dispersion control means included in the optical path, dispersion characteristics of which are to be detected.

In the mode-locked laser apparatus just mentioned above, the dispersion control means is a section of an optical fiber with appropriate dispersion and length.

In the mode-locked laser apparatus just mentioned above, the dispersion control means can be a chirped fiber Bragg grating.

In any one of the fourth and sixth to tenth mentioned mode-locked laser apparatus, the first construction can consist of two bandpass filters.

In the mode-locked laser apparatus just mentioned above, the two bandpass filters each have variable filter characteristics, and comprise means of varying their respective filter characteristics before or during the use of the mode-locked laser apparatus in order to maintain a predetermined relationship among the filter characteristics.

As described above, with the mode-locked laser apparatus according to the present invention, it is possible to use the chromatic dispersion characteristics of the optical path to generate a feedback signal for the optical path length. So, it is possible to use an even wider-bandwidth Fabry-Perot filter without requiring use of electrical devices with wide bandwidth characteristics, and thus the manufacturing cost can be reduced.

In addition, with the present invention, in a higher-order mode-locked laser, it is possible to utilize the chromatic dispersion characteristics of the optical path to detect the optical path length and generate a feedback signal for the optical path length.

Moreover, with the present invention, it is possible to utilize the chromatic dispersion characteristics of the optical path to generate a feedback signal for the optical path length. So, pulses with a high repetition rate can be generated readily with a higher-order mode-locked laser, and thus detection of chromatic dispersion characteristics can be done readily in this region also.

The above and other objects and features of the invention will be better understood from a consideration of the following detailed description based upon the accompanying drawing.

DESCRIPTION OF THE PREFERRED EMBODIMENTS

First, the principle of operation of the present invention will be described. Here follows an example of the present invention applied to the ultra-high repetition rate higher-order mode-locked laser shown in Reference 3, given a structure such that it can operate stably over long periods of time.

Figure 1:
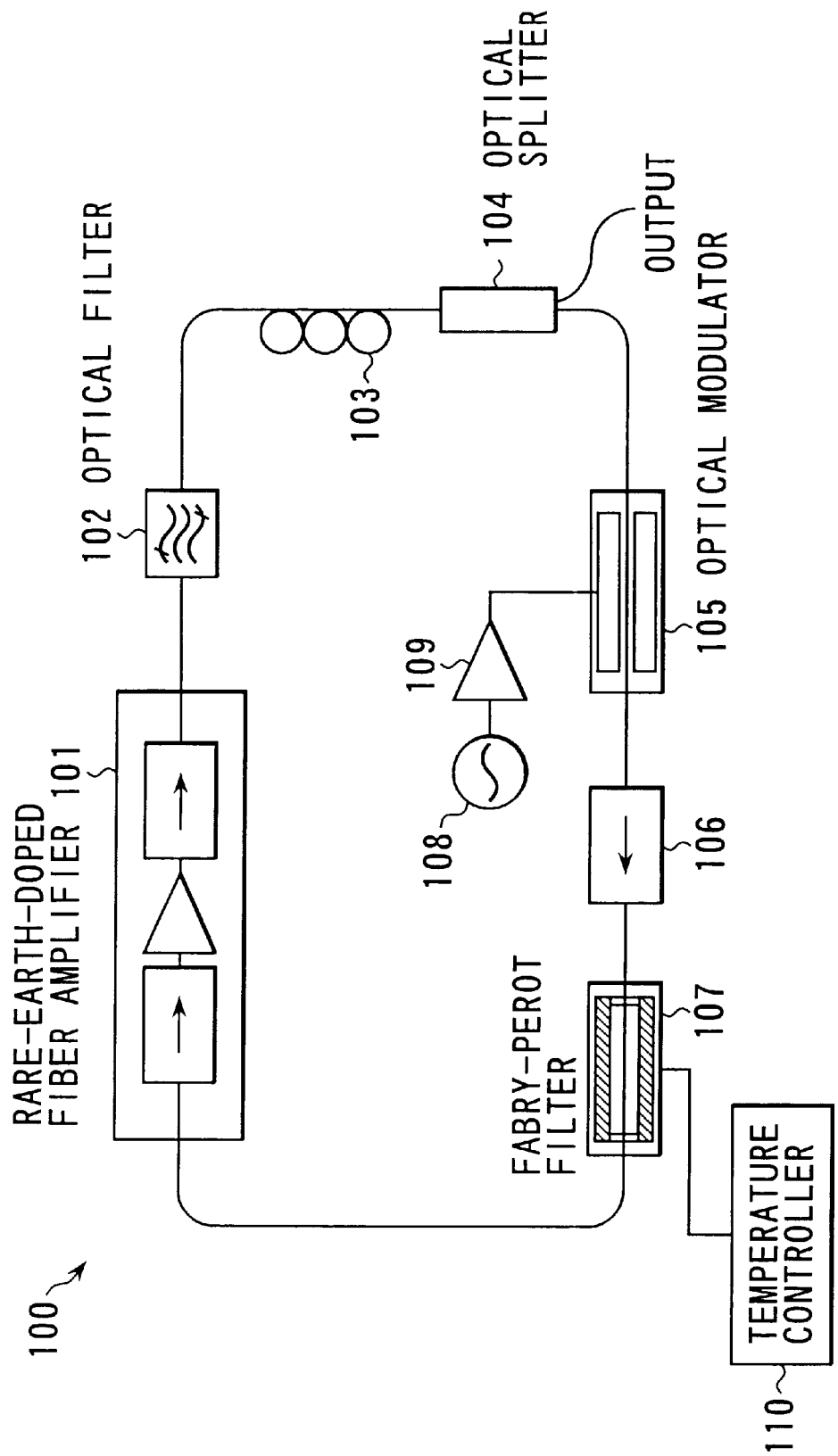
FIG. 1 is a block diagram showing a conventional higher-order mode-locked laser pulse generator.
Figure 2:
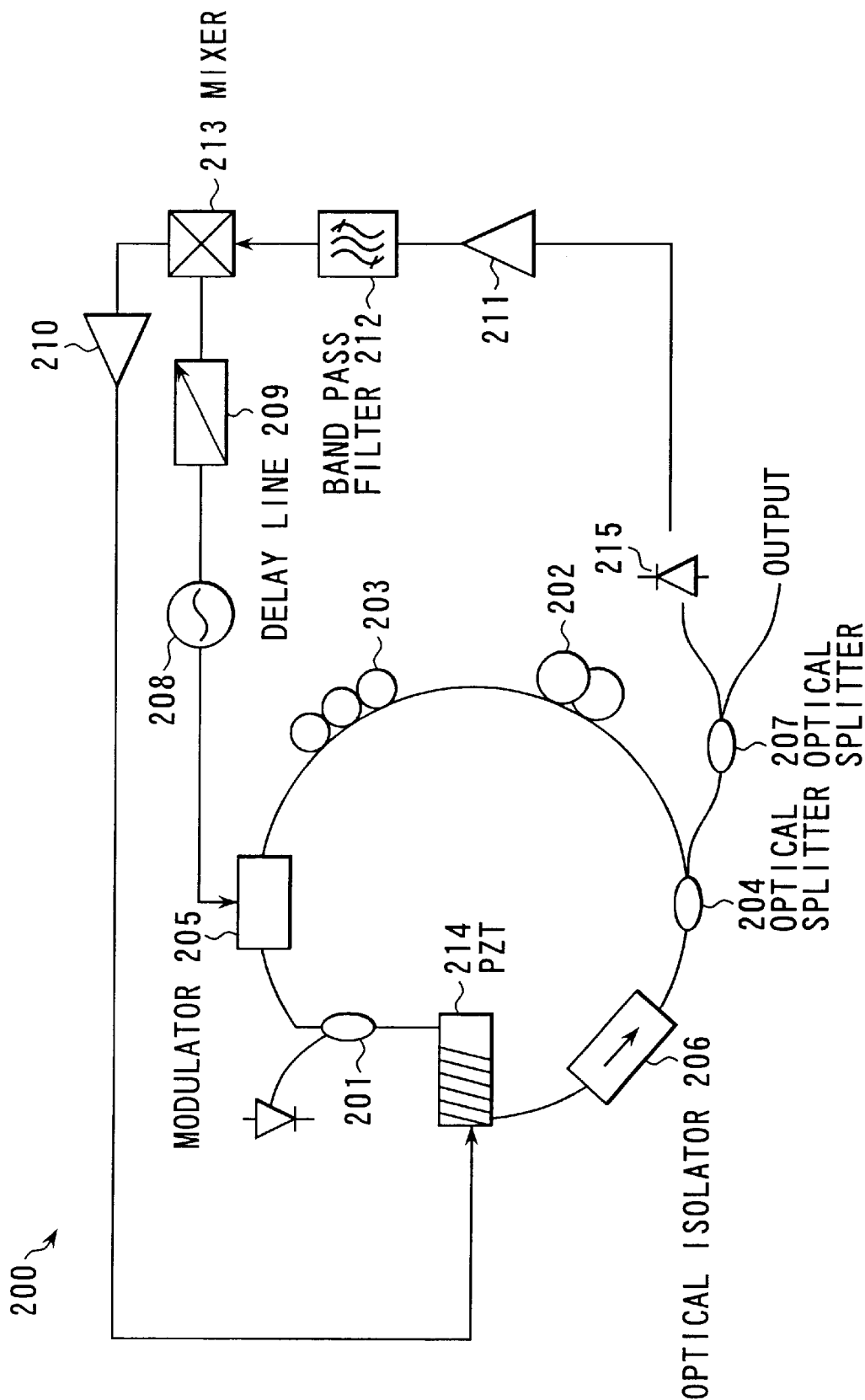
FIG. 2 is a block diagram showing a laser apparatus based on a conventional pulse phase locking stabilization method.
Figure 3:
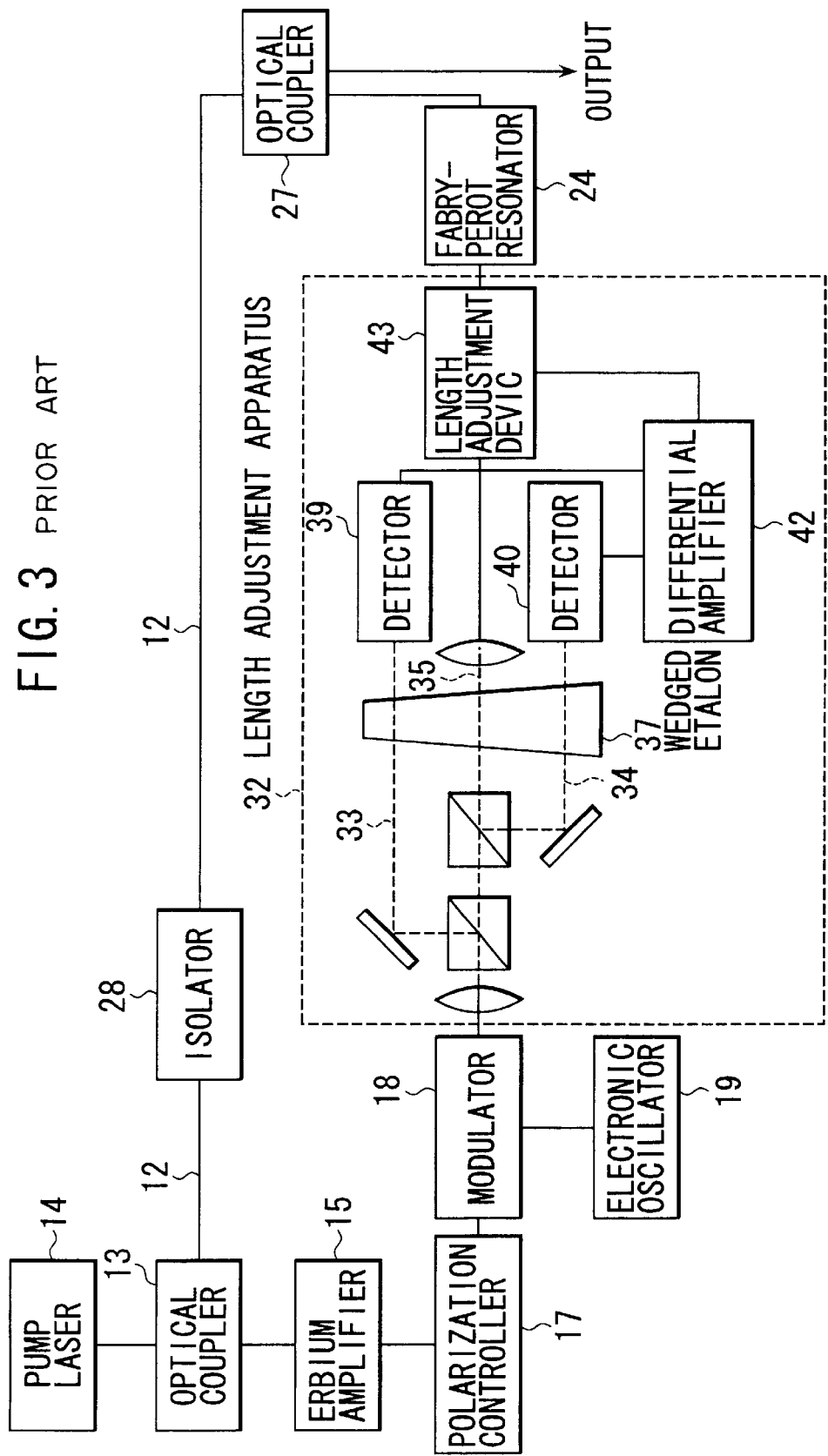
FIG. 3 is a block diagram showing a laser apparatus based on a conventional method of performing stabilization using a Fabry-Perot filter.
Figure 4:
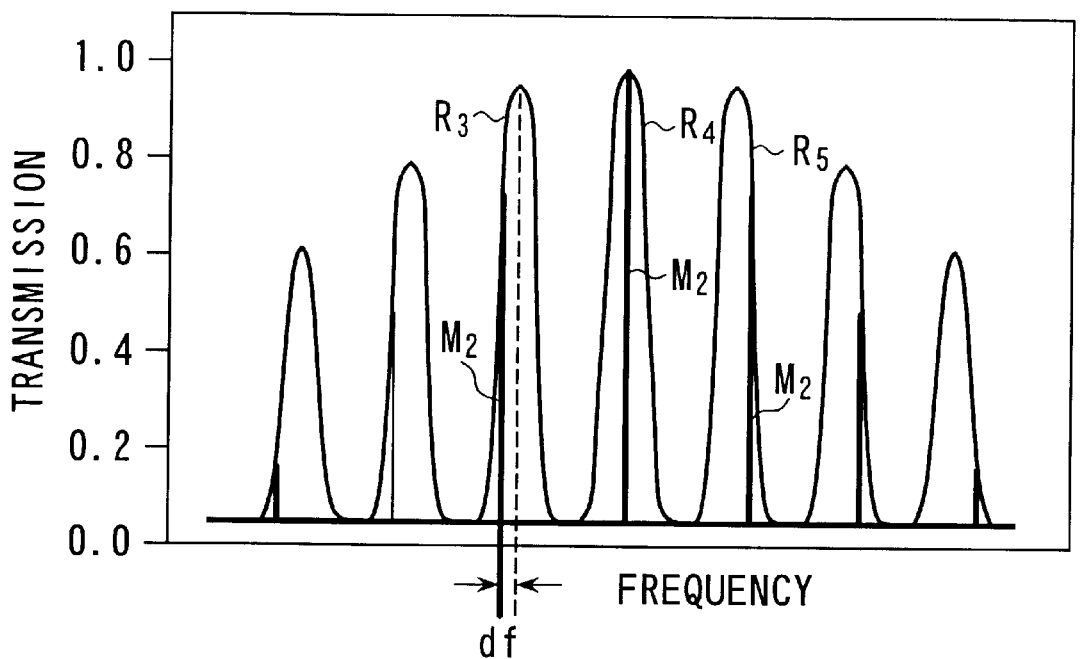
FIG. 4 shows the positional relationship between the FSR of a Fabry-Perot resonator and the pulse repetition rate, FIG. 4(a) being a schematic diagram showing the Fabry-Perot resonator detuned such that the FSR deviates from a frequency exactly equal to the pulse repetition rate by a frequency equal to df, and FIG. 4(b) being a schematic diagram showing how a small change in the length of the optical path causes the ring modes of the Fabry-Perot modes determined by the length of the optical path of the closed-loop ring of the laser to move slightly to the right.
Figure 4:
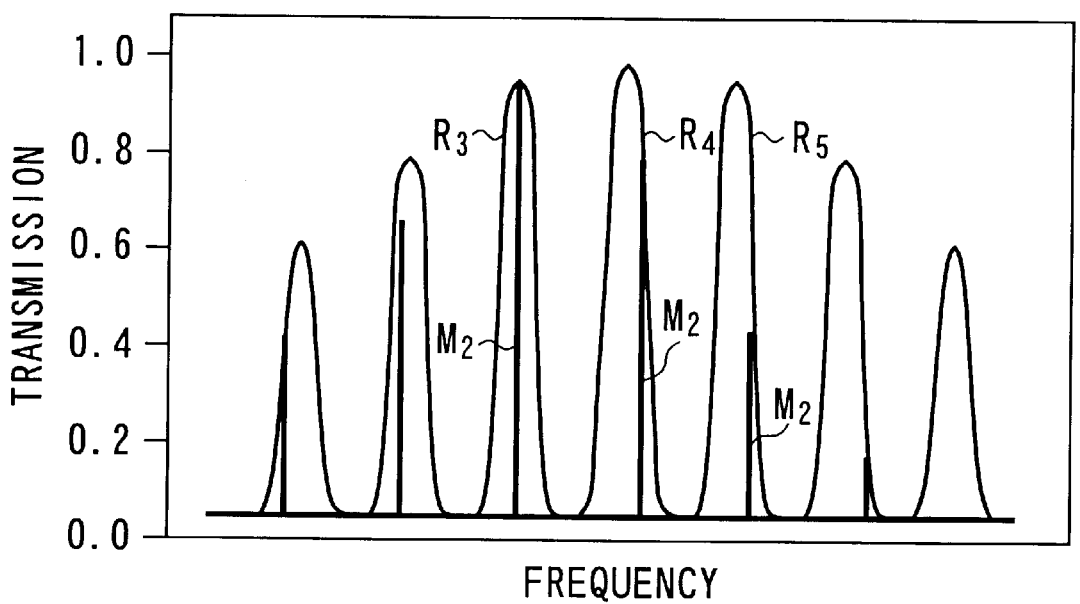
Figure 5:
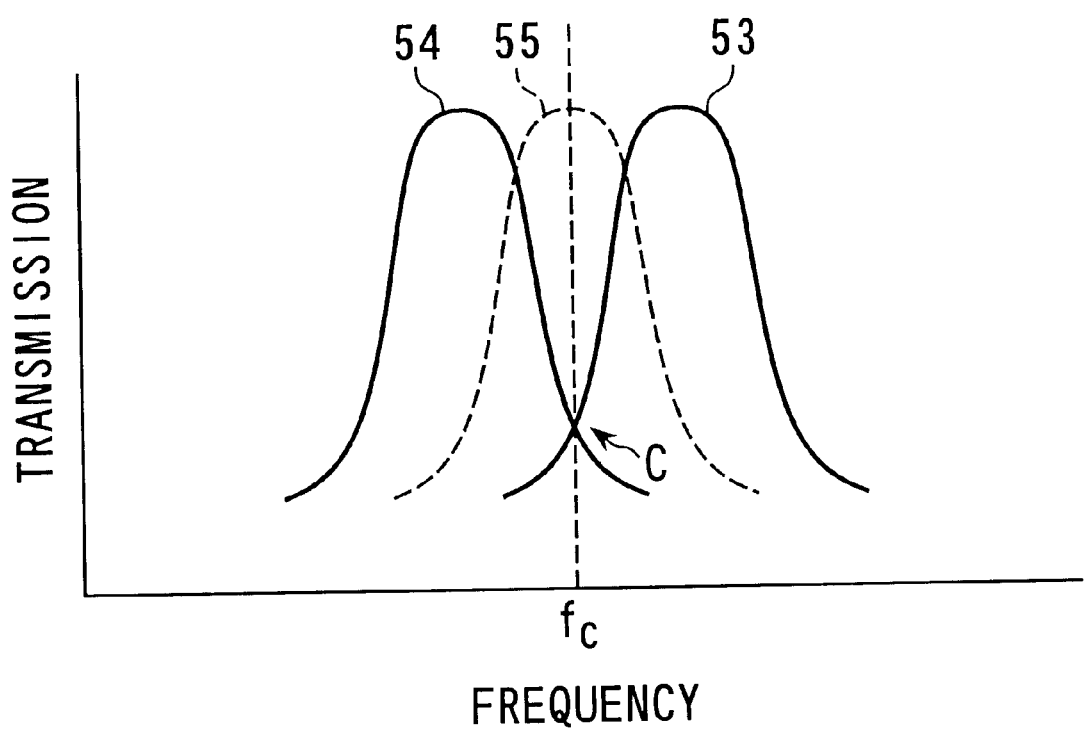
FIG. 5 is a diagram showing the changes in characteristics depending on the position of the etalon.
Figure 6:
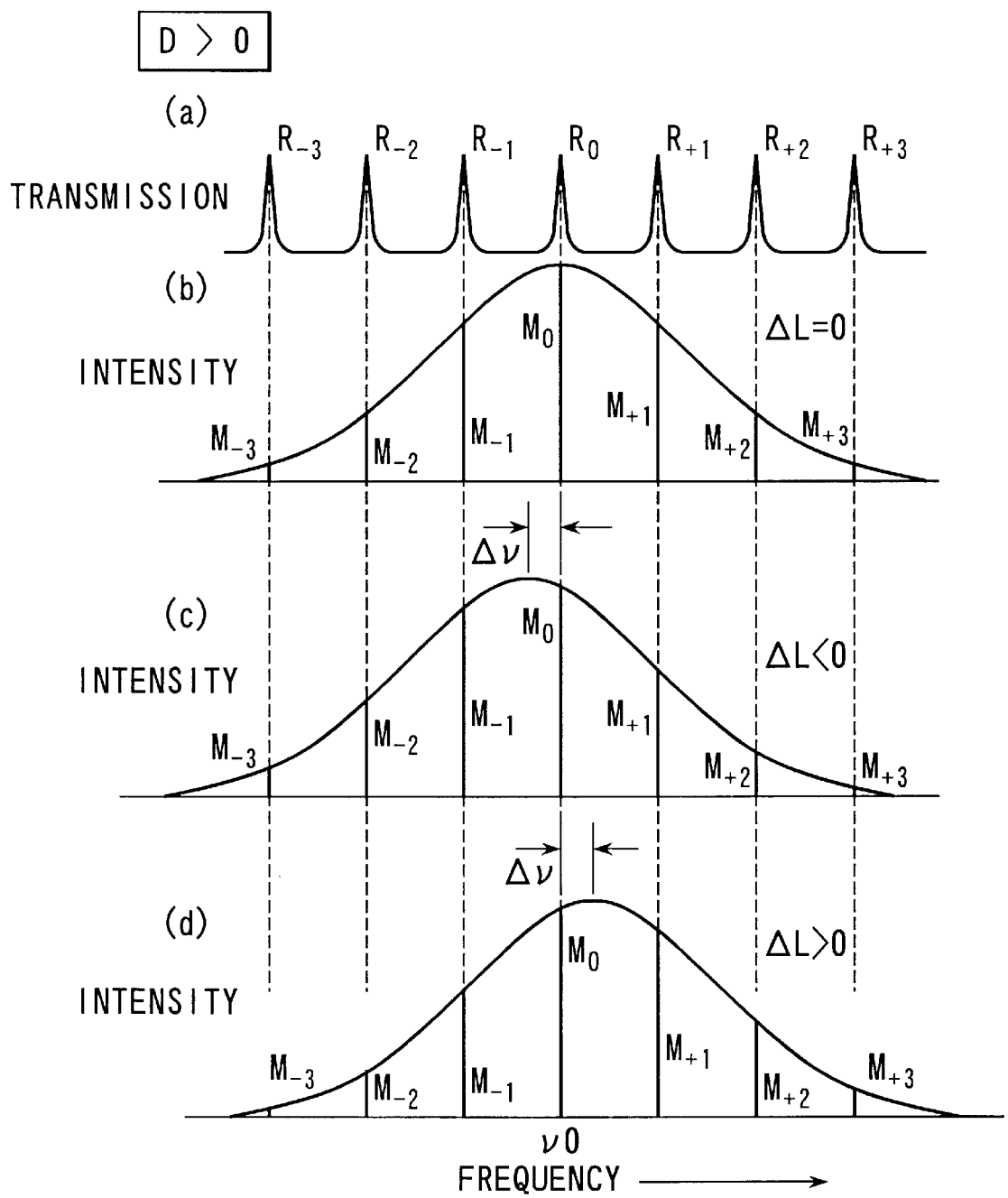
FIG. 6 shows, in a resonator having a positive dispersion parameter D, the positional relationships among the FSR of a Fabry-Perot resonator, the pulse repetition rate and the envelope, FIG. 6(a) showing the transmission of the filter, FIG. 6(b) being a schematic diagram showing the spectrum in the case of no change in the optical path length, FIG. 6(c) being a schematic diagram showing the spectrum in the case of a slight change in the optical path length, and FIG. 6(d) being a schematic diagram showing the spectrum in the case that the optical path length was increased.

The principle of operation of the laser apparatus of Reference 3 will first be described with reference to FIG. 6 in the case in which modulation is performed at a constant frequency $f_m$, and K-order mode locking is performed using a Fabry-Perot filter with an FSR equal to an integral multiple thereof ($K \times f_m$). FIG. 6 is a schematic diagram showing, in a resonator having a positive dispersion parameter D, the positional relationships among the FSR of a Fabry-Perot resonator, the pulse repetition rate and the envelope.

FIG. 6(b) shows the oscillation spectrum in the case of a resonator with an optical path length L of the resonator due to a change in temperature, in the state prior to the change, namely in the state $\Delta L=0$. When the oscillation modes present within the spectrum of the mode-locked light pulses are called $M_{-3}$, $M_{-2}$, $M_{-1}$, $M_0$, $M_{+1}$, $M_{+2}$ and $M_{+3}$, these correspond to the peak frequency values of the transmission modes $R_{-3}$, $R_{-2}$, $R_{-1}$, $R_0$, $R_{+1}$, $R_{+2}$ and $R_{+3}$, respectively, of the Fabry-Perot filter shown in FIG. 6(a), thus constituting a spectrum roughly symmetric with respect to the center frequency $v_0$. To wit, the intensities of the modes $M_{-1}$, $M_{-2}$, . . . are thought to be roughly equal to $M_{+1}$, $M_{+2}$, . . . , respectively. In this manner, the frequencies of the respective modes within the spectrum are determined by the periodic transmission characteristics of FSR, and the interval among oscillation modes is equal to FSR. For this reason, as shown in the figure, the oscillation modes agree with the Fabry-Perot transmission modes, respectively. Therefore, in the case in which the temperature of the Fabry-Perot filter is constant and its characteristics are unchanged, the wavelengths of these transmission modes $R_{-3}$, . . . $R_{+3}$, are also thought to be constant. The present invention has a structure different from that of Reference 5 or Reference 6 and is characterized in that it does not require detuning between the pulse repetition rate and the FSR.

In the case that the dispersion value D of the laser oscillator is not negligible near the oscillation wavelength, the frequency components of the spectrum will pass through the fiber laser resonator each at a different group velocity. In this case, at a frequency corresponding to the peak of the spectrum envelope, if the group velocity within the optical path of the oscillator is $v_g$, then the average fundamental repetition rate is given by $v_g/L$, and Equation 1 which represents the conditions for mode locking is rewritten as in Equation 5 below.

$$\frac{N \cdot v_g}{L} = \frac{N}{\beta_1 L} = f_m \quad (5)$$

Here, $\beta_1 = 1/v_g = \delta\beta/\delta\omega$, $\beta$ is a propagation constant and $\omega$ is the angular frequency. Here $\beta_1$ is a function of the wavelength. If the modulation frequency $f_m$ is constant, then when the optical path length L of the resonator varies slightly by $\Delta L$ due to changes in the ambient temperature, the center frequency of the oscillation spectrum also shifts slightly by $\Delta\omega$. Thereby, even in the state after a temperature change, the spectral envelope moves to satisfy Equation 5. Next, it will be described how far the spectral envelope shifts when the optical path length of the oscillator changes by $\Delta L$.

Taking $f_m$ to be constant and differentiating Equation 3 with respect to the wavelength $\lambda$, and also substituting $D = \delta\beta_1/\delta\lambda$ as the dispersion value of the oscillator gives:

$$D = -\frac{N}{f_m L^2} \cdot \frac{\delta L}{\delta \lambda} = -\frac{\beta_1}{L} \cdot \frac{\delta L}{\delta \lambda} = \frac{\beta_1 \cdot v^2}{L \cdot c} \cdot \frac{\delta L}{\delta v} \quad (6)$$

Here, $v$ ($=\omega/2\pi$) is the frequency of light.

If the optical path length of the resonator is changed by $\Delta L$ from Equation 6, then the amount of shifting of the center frequency of the envelope of the aforementioned spectrum becomes as follows.

$$\Delta v = \frac{\beta_1 \cdot v^2}{D \cdot L \cdot c} \cdot \Delta L \quad (7)$$

In the case that D is positive, when the optical path length of the resonator becomes larger ($\Delta L>0$), then the center frequency of the spectrum also becomes larger. In the same manner, when the optical path length of the resonator becomes smaller ($\Delta L<0$), then the center frequency of the spectrum also becomes smaller.

FIG. 6 shows the shift in the spectrum envelope occurring due to the change $\Delta L$ in the optical path length of the resonator. In this manner, when the optical path length of the resonator changes, the envelope of the oscillation spectrum moves to the right or left with respect to the center frequency $v_0$ prior to the change. However, since the positions of the respective oscillation modes are fixed, even if the envelope moves, only the intensities of mode $M_{-1}$ and mode $M_{+1}$ change, and their positions are virtually unchanged in comparison to the bandwidth of the filter. From FIG. 6, at D>0, when the optical path length of the resonator becomes shorter, $M_{-1}$ becomes more intense than $M_{+1}$. And conversely, when the optical path length of the resonator becomes extended, mode $M_{+1}$ becomes more intense than $M_{-1}$, as shown in FIG. 6(d). Therefore, from the difference in intensity of modes the same distance in frequency away from the center frequency $v_0$ prior to the change, the amount of the change in the optical path length of the oscillator can be determined, and from the sign of the difference in intensity, it can be determined whether the optical path length of the oscillator has become larger or smaller.

Figure 7:
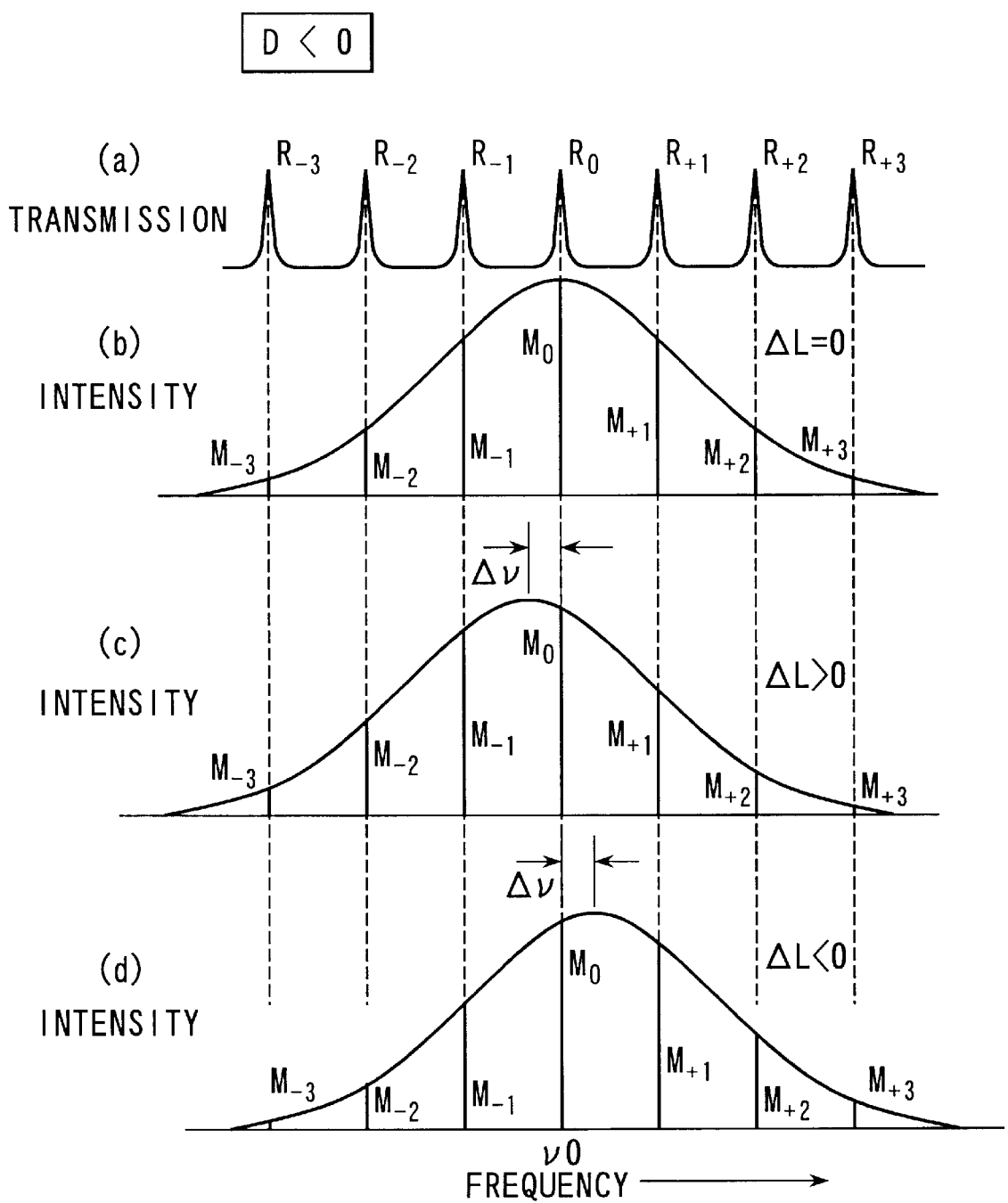
FIG. 7 shows, with a negative dispersion parameter D, the positional relationships among the FSR of a Fabry-Perot resonator, the pulse repetition rate and the envelope, FIG. 7(a) showing the transmission of the filter, FIG. 7(b) being a schematic diagram showing the spectrum in the case of no change in the optical path length, FIG. 7(c) being a schematic diagram showing the spectrum in the case that the optical path length was decreased, and FIG. 7(d) being a schematic diagram showing the spectrum in the case that the optical path length was increased.

In the case that the dispersion value D is negative, the relationship between the change in the optical path length and the various modes is as shown in FIG. 7.

It can be seen from the above that slight changes in the length of the optical path can be detected by detecting changes in the envelope of the output frequency spectrum.

Here, it must be specially noted that the Fabry-Perot filter used within the resonator need not necessarily be detuned such that the FSR deviates from the pulse repetition rate. Because of this, even oscillation modes far away from the center of the oscillation spectrum can be aligned to the pass-bands of the Fabry-Perot filter within the resonator. As a result, oscillation in a wide spectrum is possible so it is possible to generate the short pulses characteristic of a broad spectrum.

Next, using FIG. 8, the method of using this phenomenon to have a higher-order mode-locked laser apparatus operate stably will be explained. In order to stabilize the oscillation frequency in the structure shown in FIG. 8, optical splitters 312 and 313 are used to extract from the output of the fiber laser first and second beam components 330 and 340 that are caused to pass through optical bandpass filters 314 and 315, respectively. Here, as shown in FIG. 9, the pass-band of optical bandpass filter 314 is set to be $-v_f$ from the center frequency $v_0$, while the pass-band of optical bandpass filter 315 is set to be $+v_f$ from the center frequency $v_0$. Here, the value of $v_f$ is to be a value less than half of the spectrum width (full-width at half maximum). The short-term average intensity of the light passing through the optical bandpass filters 314 and 315, respectively, is detected using photodetectors 316 and 317, and the difference between these average intensities is used to provide a feedback circuit that automatically adjusts the optical path length of the laser resonator.

Here, the pass-bands of filters 1 and 2 are frequency-dependent, so the change in the envelope of the light-pulse spectrum is detected as a change in the light intensity detected by the detectors 316 and 317. The outputs of these detectors are provided as input to the differential amplifier 318. In addition, the output of the differential amplifier 318 is subjected to signal conversion by a well-known differential-type nonlinear controller 327, amplified using an amplifier 319, and then provided as input to an optical path length controller 320. The optical path length controller adjusts the length of the optical path of the ring laser in accordance with this output.

In addition, the intensity of the error signal of the feedback circuit is determined by how far the spectral envelope moves due to the change in the optical path length of the resonator. Specifically, from Equation 7, it can be seen that the shift in the envelope with respect to the change in the optical path length is determined by the dispersion value D. Therefore, the dispersion of the resonator is preferably adjusted to an optimal value. One method of adjusting the dispersion value in this manner is the method of providing an optical fiber of appropriate dispersion and length within the resonator. For example, if the dispersion value is D and an optical fiber with a different dispersion $D_c$ and optical path length $L_c$ is inserted into the resonator, then the effective dispersion value of the new resonator becomes $(D \cdot L + D_c \cdot L_c)/(L + L_c)$. Therefore, by appropriately selecting the length and dispersion of the optical fiber used for dispersion adjustment, the effective value of the dispersion value D can be made positive or negative, and the value can also be varied freely. It is clear that the relationship among the sign of this effective dispersion, the elongation or contraction of the optical path length and the sign of the voltage applied is to be examined, so that the sign of the error signal can be adjusted and the voltage applied to the optical path length controller determined such that the circuit used for adjusting the optical path length is of the negative-feedback type.

There is no reason to limit the method of adjusting the dispersion value to that described above, as it is sufficient to insert optical components which have other dispersion characteristics. Components that can be used for this purpose include a chirped fiber Bragg grating or the like, for example.

In the aforementioned explanation, a laser structure (including a Fabry-Perot resonator) included in the resonator has been described. As shown in Equations 5, 6 and 7, however, the relationship among the change in the optical path length $\Delta L$, the amount of shift in the spectral envelope $\Delta v$ and the chromatic dispersion D of the optical path of the resonator is clearly also applicable to the case in which there is no filter in the resonator. Therefore, the aforementioned feedback circuit which performs the control of the optical path length using the chromatic dispersion characteristics of the laser is similarly applicable to the case of an ordinary mode-locked laser wherein a Fabry-Perot filter is not used in the resonator.

EXAMPLES

Here follow examples of working the present invention based upon the aforementioned principles of operation. Note that elements or apparatus having the same functions are given the same symbols.

Example 1

Figure 8:
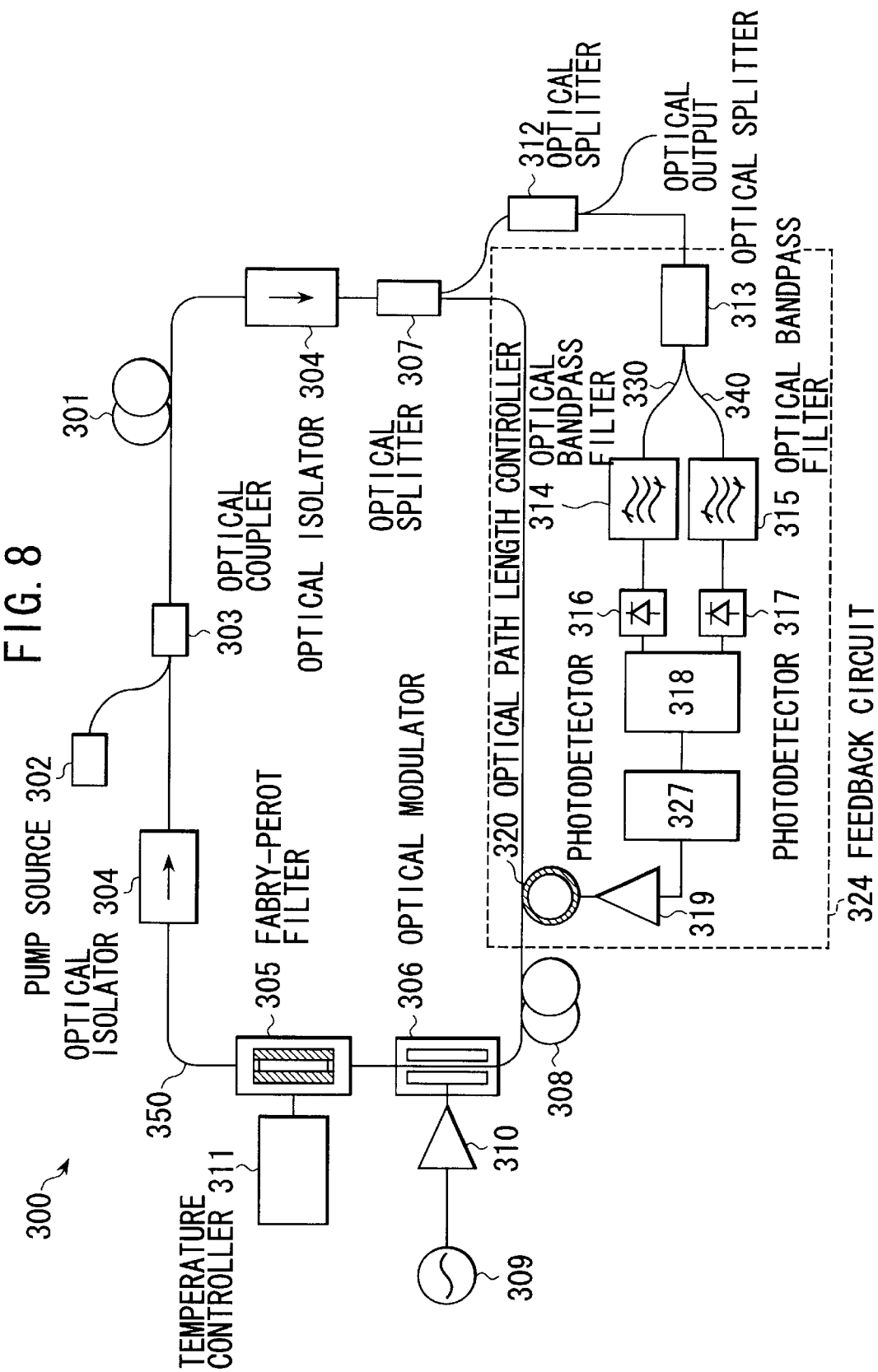
FIG. 8 is a block diagram showing the higher-order mode-locked laser according to the present invention.
Figure 9:
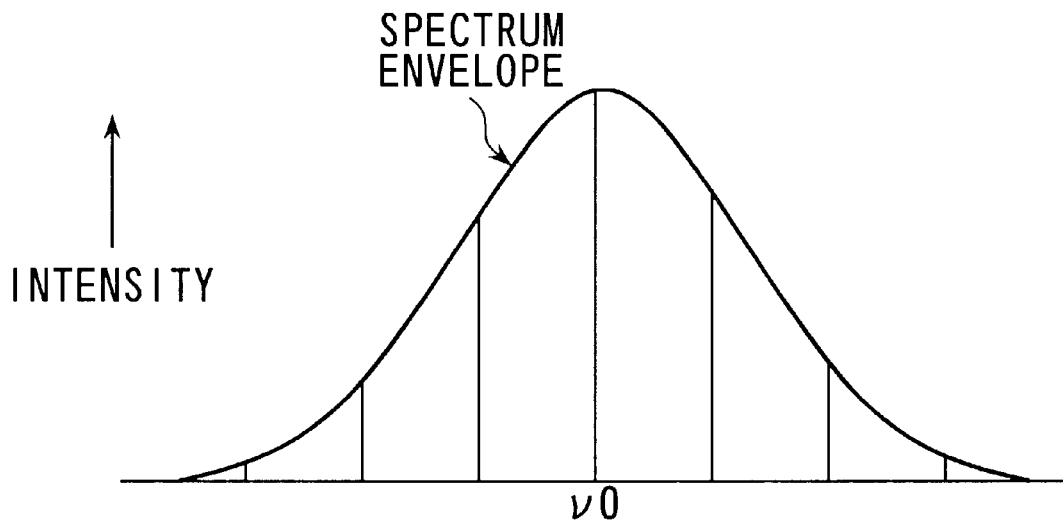
FIG. 9 shows the positional relationships among the pulse repetition rate and the envelope, FIG. 9(a) being a schematic diagram showing the spectrum and envelope, and FIG. 9(b) being a schematic diagram showing the transmission of the filter.
Figure 9:
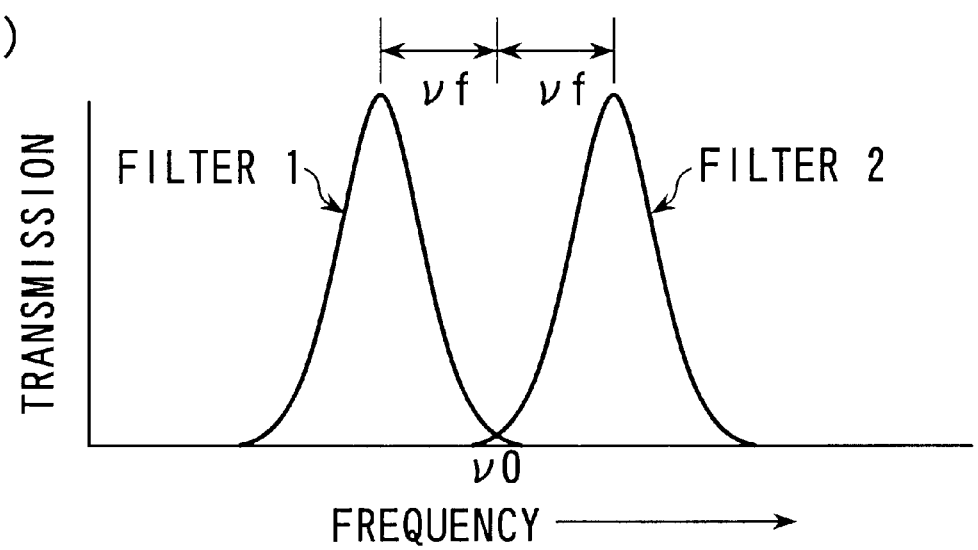

The block diagram of FIG. 8 shows one example of the working of laser pulse oscillation according to the present invention. In FIG. 8, the laser resonator consists of a rare-earth-doped optical fiber 301, optical isolator 304, optical splitter 307, optical path length controller 320, dispersion-adjusting optical fiber 308, optical modulator 306, Fabry-Perot filter 305 and optical isolator 304 connected in a ring. When used in the wavelength region of a 1.55 micron wavelength, the rare-earth-doped optical fiber used may be a single-mode optical fiber (erbium-doped optical fiber). This erbium-doped optical fiber is excited using a pump source 302 to give gain to the laser light within the resonator. The optical isolator 304 is used for the purpose of propagating light in one direction within the resonator and also minimizing the effects of reflection. As the modulator for achieving mode locking at a high repetition rate, a phase modulator (for example, one with a waveguide of lithium niobate) is used. The Fabry-Perot filter is used for the purpose of performing higher-order mode locking. Here, in order to perform K-order mode locking, the free spectral range (FSR) of the Fabry-Perot filter is selected such that in the relationship with the modulation frequency, $FSR \cdot Q = f_m \cdot K$, and Q and K are selected such that they are mutually prime (i.e., their greatest common divisor is 1). However, the ratio of K to Q, K/Q, is to be a value less than the finesse of the Fabry-Perot filter. In addition, temperature control is exerted to keep the transmission characteristics of the Fabry-Perot filter constant. In order to adjust the average dispersion of the resonator, a dispersion-adjusting optical fiber 308 with a specific length and dispersion value is installed within the resonator. Optical splitters 307 and 312 are used to extract the output.

A feedback circuit 324 that performs frequency stabilization consists of an optical splitter 313, optical bandpass filters 314 and 315, photodetectors 316 and 317, differential amplifier 318, a differential-type nonlinear controller 327, amplifier 319 and optical path length controller 320. In order to perform stabilization, optical splitters 312 and 313 are used to extract from the output of the fiber laser a first beam component 330 and a second beam component 340 which are caused to pass through optical bandpass filter 314 and optical bandpass filter 315, respectively. Here, as shown in FIG. 9, the pass-band of optical bandpass filter 314 is set to be $-v_f$ from the center frequency $v_0$, while the pass-band of optical bandpass filter 315 is set to be $+v_f$ from the center frequency $v_0$. Here, the value of $v_f$ is to be a value less than half of the spectrum width (full-width at half maximum). The short-term average intensity of the light passing through the optical bandpass filters 314 and 315, respectively, is detected using photodetectors 316 and 317. The difference between these average intensities is extracted using the differential amplifier 318, and the electrical difference signal thus obtained is passed through the differential-type nonlinear controller 327, amplified and then provided as input to the optical path length controller 320. The optical path length controller 320 adjusts the optical path length of the ring laser as a function of this output.

A single-mode optical fiber wrapped around a cylindrical piezoelectric transducer is used as the optical path length controller. Other types of optical path length controllers include one consisting of an optical fiber coated with metal, and then a current is caused to flow between the two ends of the optical fiber, thereby adjusting the optical path length by means of the temperature change due to this heating, as such optical fibers are already well known.

If such a laser oscillator is to be of the polarization-maintaining (PM) type, it is sufficient to make all of the optical elements contained in the resonator and the optical fiber that connects them of the PM type. In addition, if there is no particular necessity for it to be of the PM type, there is no need for all of the optical elements contained in the resonator and the optical fiber that connects them to be of the PM type, but in order to achieve stable operation with respect to the output intensity or frequency, it is preferable to use a polarization controller.

Example 2

Figure 10:
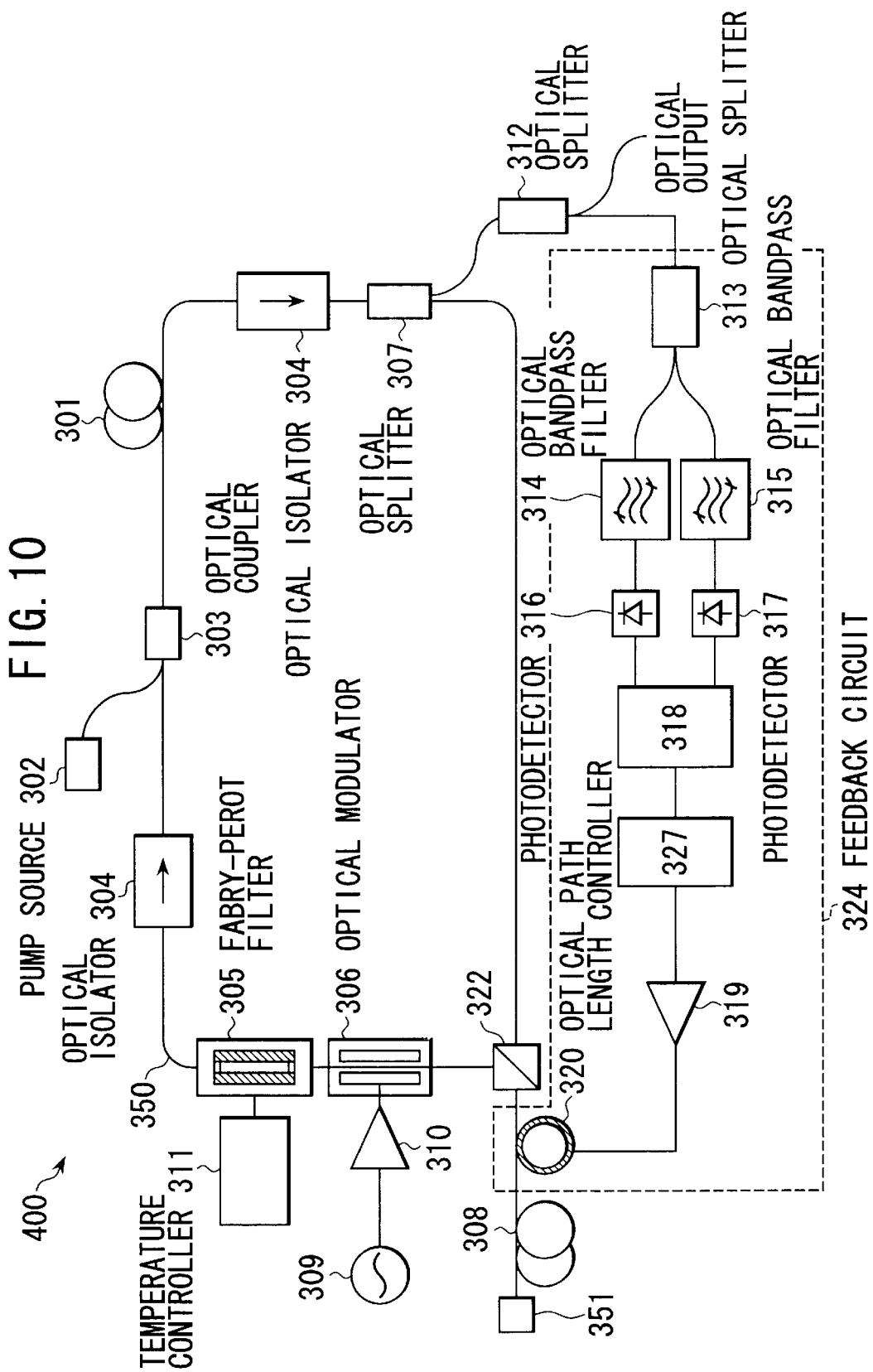
FIG. 10 is a block diagram showing an example using non-PM components when the laser is operated in the PM state.

As described above, in order to operate the laser in the PM state, it is necessary to make the elements used in the resonator and the connecting optical fiber of the PM type. For example, in Example 1, it would be necessary to use PM also for the dispersion-adjusting optical fiber 308 used for adjusting the dispersion of the resonator. However, in the event that there is no PM optical fiber that has the appropriate dispersion value, an example of using a non-PM type instead is shown in FIG. 10. The resonator of FIG. 10 differs from the case of Example 1 on the point that it is used in a linear optical system consisting of a polarization splitter 322 and Faraday rotator mirror 351. In order to compensate for the 90° rotation of polarization due to the Faraday rotator mirror, a fiber connector 323 wherein axes analogous to a PM optical fiber are connected orthogonally is used in the PM ring optical path portion of the laser resonator.

In addition, optical elements and optical fibers and the like that do not maintain polarization are installed between the Faraday rotator mirror and polarization splitter. With such a configuration, it is possible to compensate for the effects of the birefringence of non-PM elements and optical fibers and the like contained within the aforementioned linear optical system, so polarization is maintained in the output.

Figure 12:
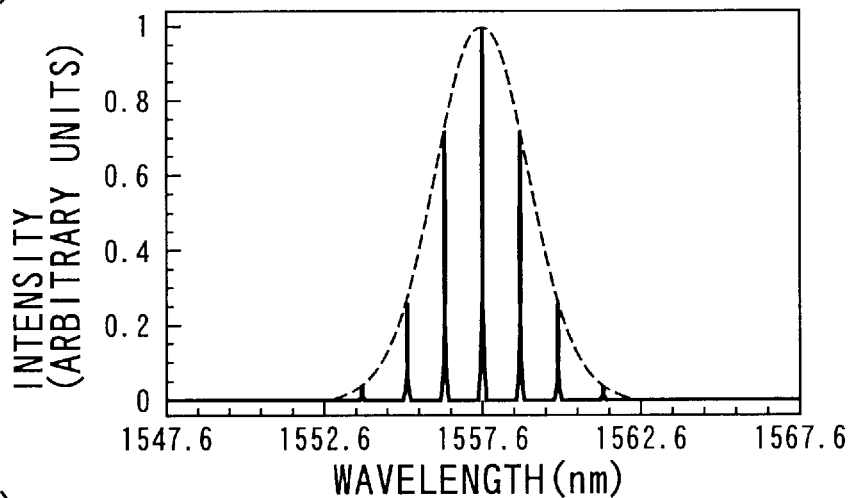
FIG. 12 shows the output characteristics of the higher-order mode-locked laser according to the present invention, FIG. 12(a) showing the output spectrum in the state wherein control according to the method of the present invention is applied to the resonator, FIG. 12(b) showing an example of the spectrum in the case wherein control according to the method of the present invention is not applied, and the optical path length becomes larger than in the optimal state, and FIG. 12(c) being a diagram showing an example of the spectrum in the case wherein control according to the method of the present invention is not applied, and wherein the optical path length becomes slightly smaller than in the optimal state.
Figure 12:
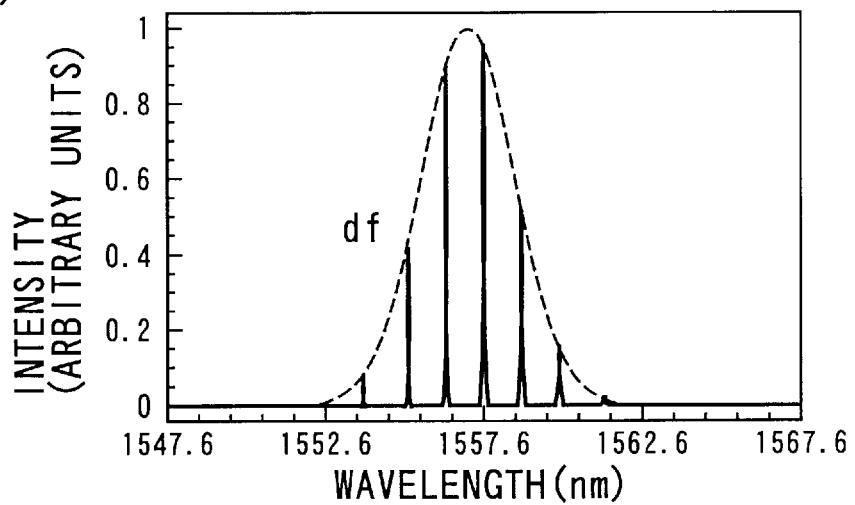
Figure 12:
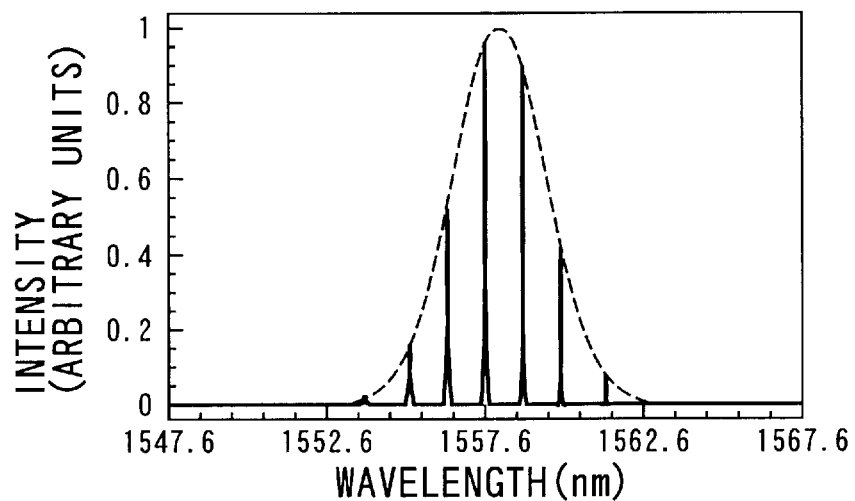

Here follows a description of the polarization-maintaining (PM) configuration described in Example 2 in more specific detail, using an example of a higher-order mode-locked laser that generates a pulse train with a repetition rate of 153.8 GHz. A PM single-mode optical fiber with an erbium concentration of 1410 ppm is used as the gain medium. For the purpose of mode locking, a 40-GHz LiNbO$_3$ phase modulator is used to perform modulation between 38.5 GHz and 38.35 GHz. The index of modulation is approximately 3.0 radian. In addition, in order to perform fourth-order mode locking, a fiber-type Fabry-Perot filter having an FSR of 153.8 GHz is used. The temperature of the Fabry-Perot filter is controlled so that temperature fluctuation is ±0.005° C. or less. A 200-mW semiconductor laser operating at a wavelength of 1.48 micron is used to excite the erbium-doped optical fiber. In addition, the effective dispersion value of the resonator is adjusted using the dispersion-adjusting optical fiber 308. The optical path length controller is made by wrapping a 60-m dispersion-shifted single-mode optical fiber around a cylindrical piezoelectric transducer, and the change in its effective optical path length when a voltage of 1000 V is applied to the piezoelectric transducer is approximately 6.5 mm (round-trip). FIG. 12(a) shows an example of the output spectrum in the state wherein the resonator length is optimized to the modulation frequency applied. The bandwidth of the Fabry-Perot filter used in the experiment is 750 MHz (finesse of approximately 200). This bandwidth of 750 MHz is 750 times the fundamental repetition rate of approximately 1 MHz. In addition, two variable-frequency optical bandpass filters with half-value widths of approximately 1.4 nm are used in the feedback circuit. The center-to-center distance between these passbands is adjusted to be approximately 2.4 nm.

In this state, the oscillation modes are symmetric with respect to the center frequency of the spectrum. When control according to the method of the present invention is not applied, FIG. 12(b) shows an example of the spectrum when the optical path length is made slightly larger than in the optimal state, while FIG. 12(c) shows an example of the spectrum when it is made smaller. It can be clearly seen that the spectrum envelope has moved. This example is a case of D>0.

Figure 13:
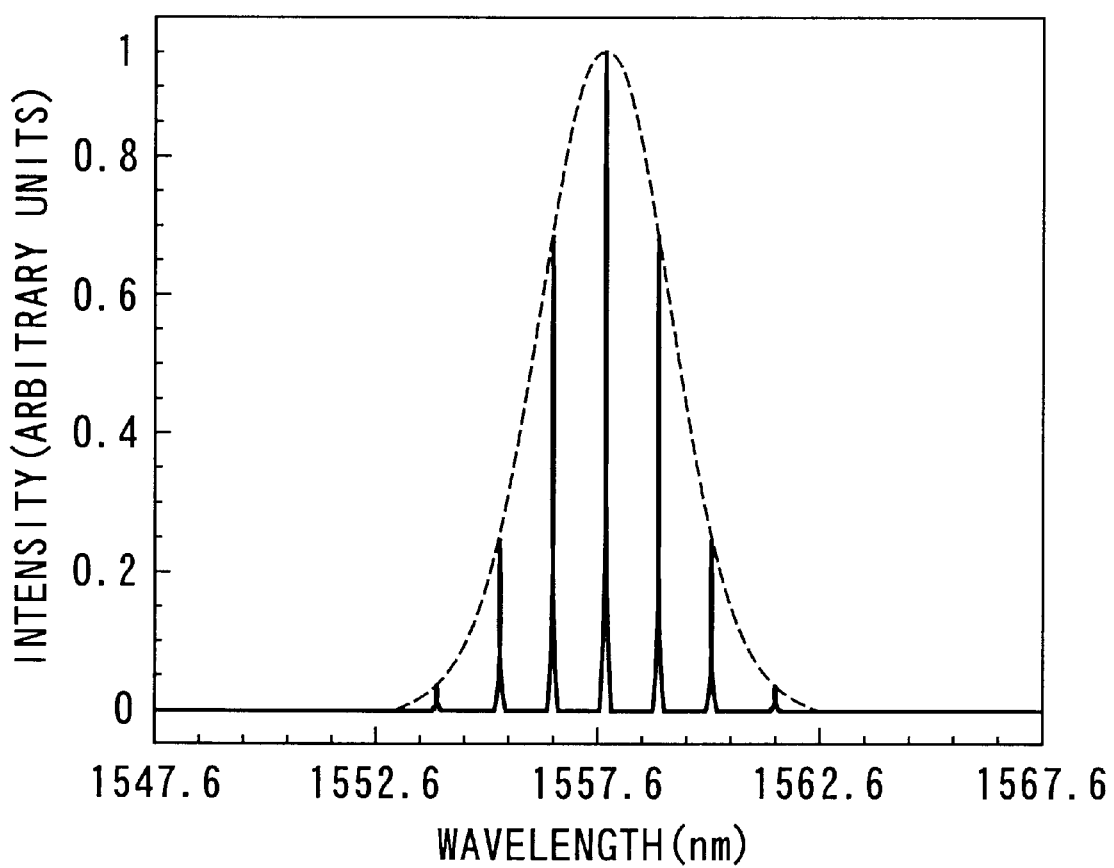
FIG. 13 is a diagram showing the spectrum in the state wherein control according to the method of the present invention is applied.
Figure 14:
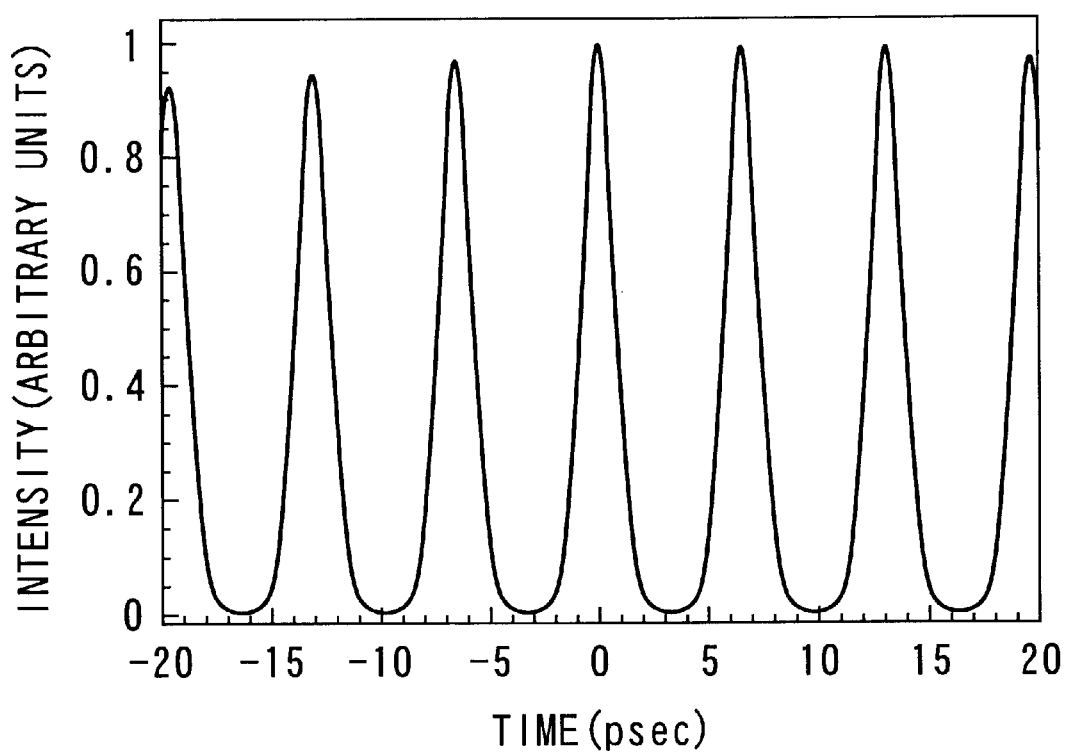
FIG. 14 is a diagram showing the self-correlated waveform after the output light of a laser controlled by means of the method of the present invention is passed through a 39-meter single-mode fiber and subjected to chirp compensation.
Figure 15:
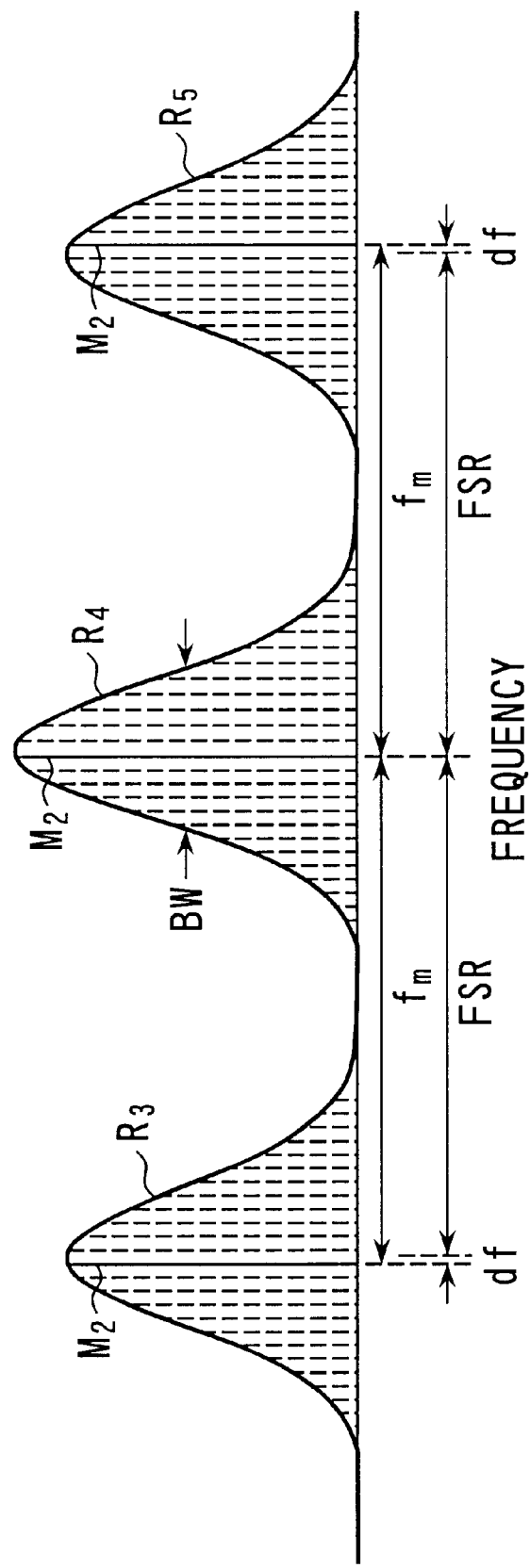
FIG. 15 is a diagram showing the relationship among a Fabry-Perot mode with a wide bandwidth (BW), the oscillator mode and the oscillator vertical mode.

FIG. 13 shows the spectrum when control according to the method of the present invention is applied. FIG. 14 shows the pulse waveform at this time. This pulse waveform is the result of measurement when the laser output has been passed through a 39-meter single-mode fiber and subjected to chirp compensation. By automatically controlling the optical path length to be constant, it is confirmed that no changes in the spectrum or pulse waveform of the pulses has occurred even in long-term operation.

In addition, in the configuration in this example, the range of values of the dispersion over which the optical path length is adjustable is −0.732<D<−0.046 (ps/nm) and 0.046<D<0.706 (ps/nm). These values change depending on the characteristics of the optical components and electrical circuits used, but in the case of D=0, it is clear from Equation 7 that the method of the present invention cannot be applied. In this manner, the pulse frequency stabilization according to the present invention is effective in optical systems that have dispersion, but on the other hand, adjustment of the optical path length being difficult when D is near zero is one characteristic of the present invention.

Moreover, with the structure in this example, when D is set within the range given above, even in the case in which the modulation frequency is changed from the optimal modulation frequency (FSR/4) by 100 MHz in either direction (increasing or decreasing), stable operation is confirmed even without changing the sign of the signal applied to the optical length controller. In passing, adjustment of the sign of the feedback circuit is required only in the case in which the sign of D of the resonator changes.

Figure 17:
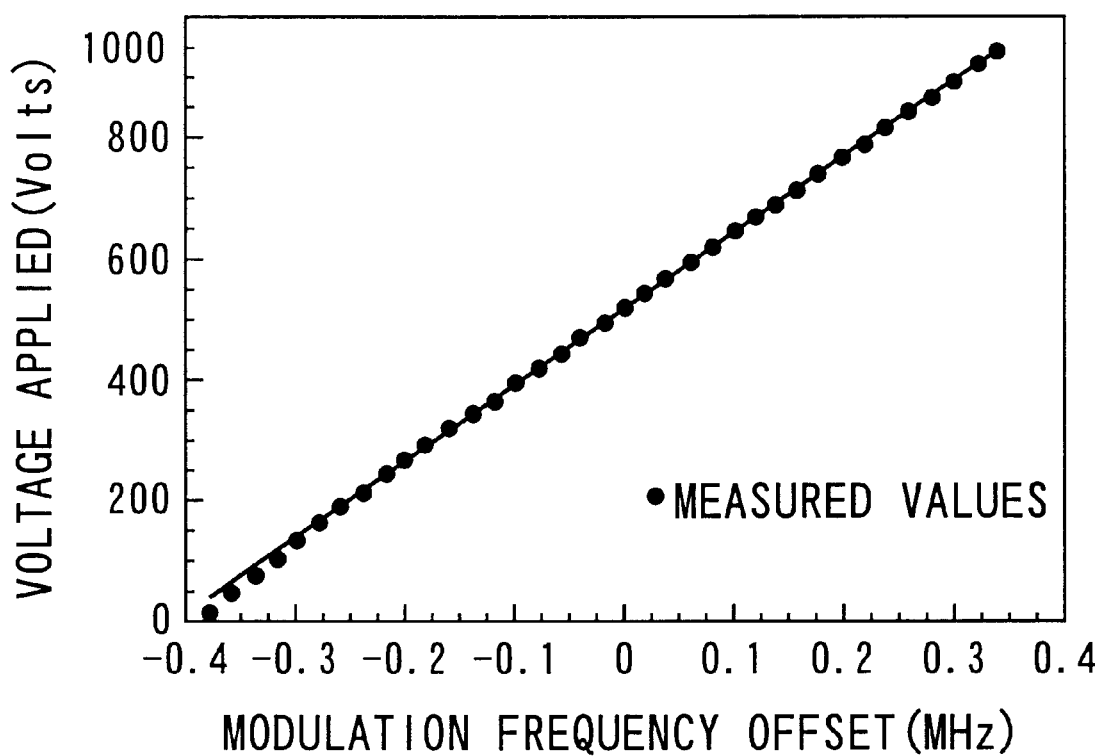
FIG. 17 is a diagram showing the relationship between the modulation frequency changed and the change in the applied voltage.

In the case that the modulation frequency is changed, the voltage applied to the optical path length controller 320 automatically changes in response thereto, so constant operation in the optimal mode locking state is achieved. FIG. 17 is a diagram showing the relationship between the change in the voltage applied and the offset in the modulation frequency at that time. This linear relationship shows that the feedback circuit is operating well.

Moreover, the optical pass-band filters 314 and 315 in the feedback circuit have their pass bands adjusted such that they move toward the long-wavelength or short-wavelength side while these pass-bands are kept at nearly constant intervals (in this case, approximately 2.4 nm), and thus the oscillation wavelength of the laser can be changed over 11 nm.

Example 3

Figure 11:
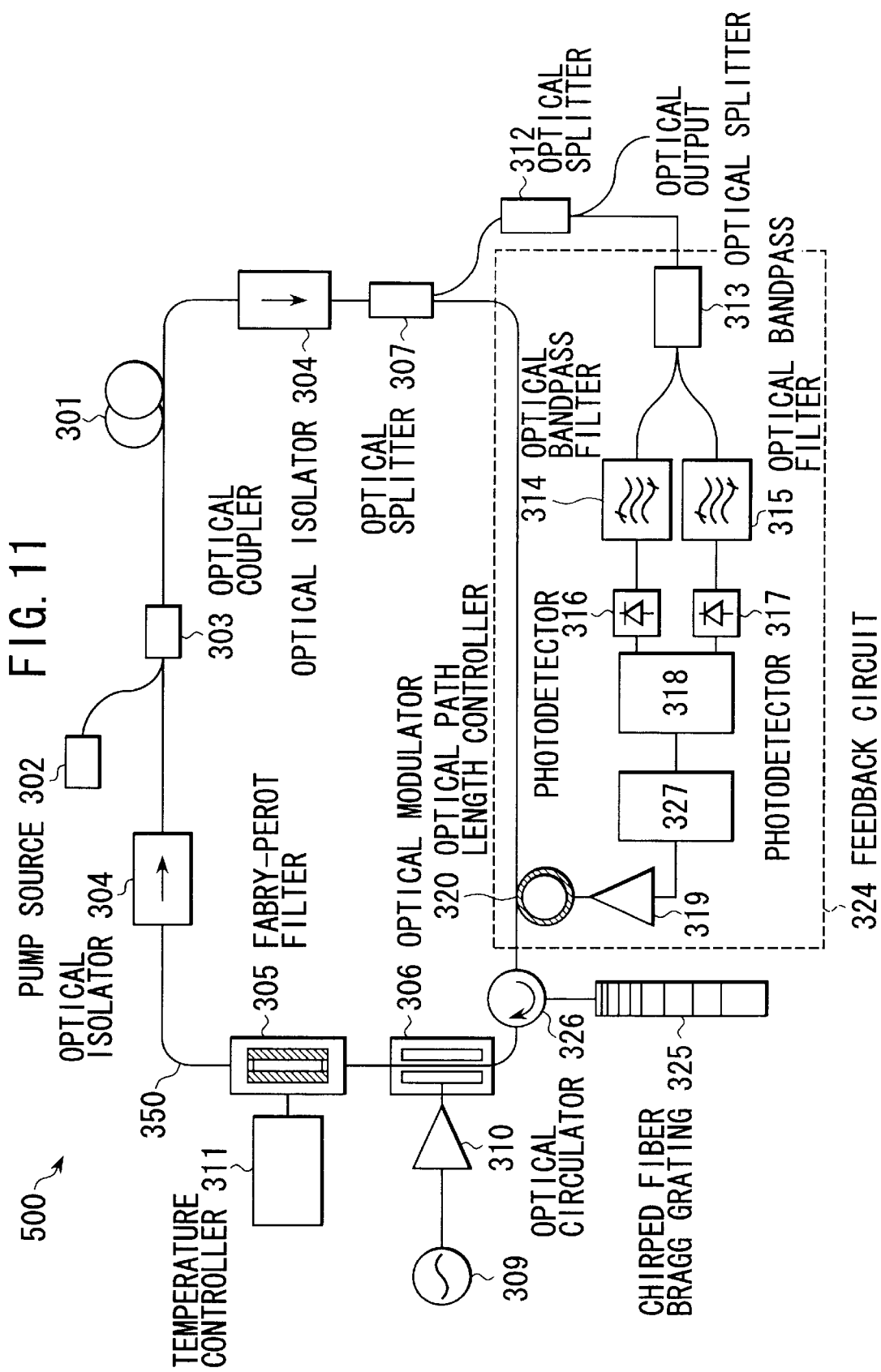
FIG. 11 is a block diagram showing an example using an optical circulator and a chirped fiber Bragg grating in the resonator in order to set the effective dispersion value within the resonator to the optimal value.

In order to realize the aforementioned mode-locked laser with a stable repetition rate, it is preferable to set the effective dispersion value within the resonator to the optimal value. A configuration wherein this effective dispersion value is optimized includes, as shown in FIG. 11, a configuration wherein an optical circulator 326 and a chirped fiber Bragg grating 325 are used in the resonator. If the optical circulator 326 and chirped fiber Bragg grating 325 used are non-PM, then it is sufficient to use a polarization controller between the optical modulator 306 and optical circulator 326 or between the optical path length controller 320 and the optical circulator.

Example 4

Figure 16:
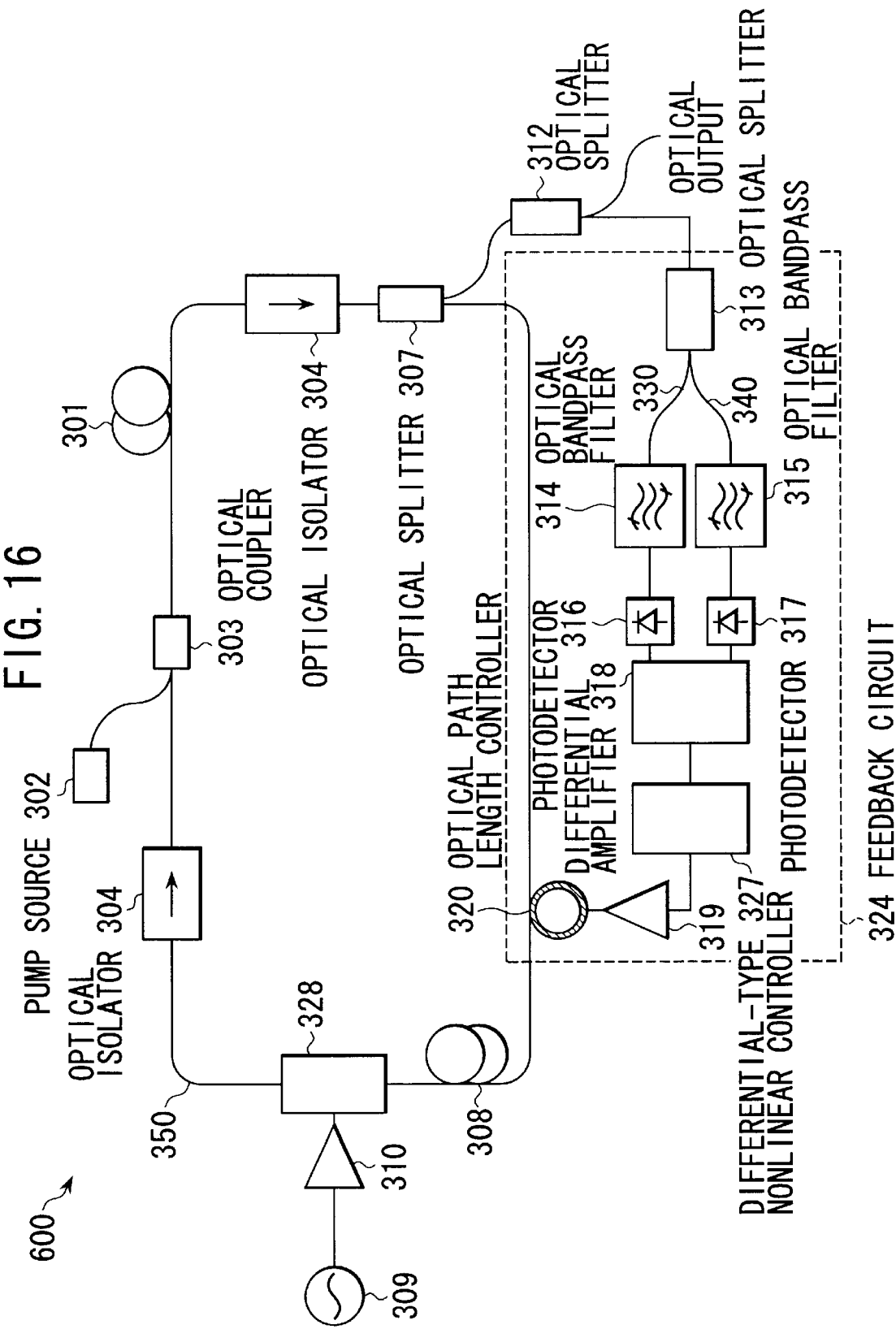
FIG. 16 is a block diagram showing an example of performing optical path length control using the chromatic dispersion characteristics of an ordinary mode-locked laser that does not use a Fabry-Perot filter within the laser resonator.

The block diagram of FIG. 16 shows an example of performing optical path length control using the chromatic dispersion characteristics of an ordinary mode-locked laser wherein a Fabry-Perot filter is not used in the laser oscillator. In FIG. 16, the laser resonator consists of a rare-earth-doped optical fiber 301, pump source 302, optical isolator 304, optical splitter 307, optical path length controller 320, dispersion-adjusting optical fiber 308, optical modulator 306 and optical isolator 304 connected in a ring. As the modulator for achieving mode locking, one having a well-known waveguide of lithium niobate is used. In addition, in order to adjust the average dispersion of the resonator, a dispersion-adjusting optical fiber 308 with a specific length and dispersion value, or a configuration such as that shown in FIG. 11 using an optical circulator 326 and chirped fiber Bragg grating 325 is installed within the resonator. Optical splitters 307 and 312 are used to extract the output.

Moreover, a feedback circuit 324 such as that shown in FIG. 11 is used to perform stabilization of the optical path. The optical path length controller may be a single-mode optical fiber wrapped around a cylindrical piezoelectric transducer or, as described above, one consisting of an optical fiber coated with metal, and then a current is caused to flow between the two ends of the optical fiber, thereby adjusting the optical path length by means of the temperature change.

In the case of this Example 4 also, if the laser oscillator is to be of the PM type, it is sufficient to make all of the optical elements contained in the resonator and the optical fiber that connects them of the PM type. In addition, if there is no particular necessity for it to be of the PM type, there is no need for all of the optical elements contained in the resonator and the optical fiber that connects them to be of the PM type, but in order to achieve stable operation with respect to the output intensity or frequency, it is preferable to use a polarization controller.

In addition, as a configuration for inserting non-PM optical elements and optical fibers or the like into a laser resonator, as shown in FIG. 10, it is possible to use a linear optical system consisting of a Faraday rotator mirror 351 and a polarization splitter 322. By means of this configuration, it is possible to compensate for the effects of the birefringence of non-PM elements and optical fibers and the like contained within the aforementioned linear optical system, so polarization is maintained in the output.

With the mode-locked laser apparatus according to the present invention, stable operation is possible even if the temperature of the resonator changes, so a pulse train having a stable waveform and spectrum can be generated by a high-repetition rate mode-locked fiber laser over the long term. In addition, it is possible to realize a mode-locked laser apparatus with a stable repetition rate of 100 GHz or greater, which has heretofore been difficult.

In addition, the invention has the aforementioned constitution and can have the effects described below.

With the invention, it is possible to generate a feedback signal for the optical path length utilizing the chromatic dispersion characteristics of the optical path, and in comparison to the conventional apparatus, no electrical elements with wide bandwidth characteristics are necessary and an even wider-bandwidth Fabry-Perot filter and the like can be used, so the manufacturing cost can be reduced.

In addition, with the invention, in a higher-order mode-locked laser, it is easy to use the chromatic dispersion characteristics of the optical path to detect changes in the optical path length and generate a feedback signal for the optical path, and in comparison to the conventional apparatus, no electrical elements with wide bandwidth characteristics are necessary and an even wider-bandwidth Fabry-Perot filter and the like can be used, so the manufacturing cost can be reduced.

In addition, with the invention, it is possible to generate a feedback signal for the optical path length utilizing the chromatic dispersion characteristics of the optical path, pulses with a high repetition rate can be generated readily with a higher-order mode-locked laser, and thus the detection of chromatic dispersion characteristics can be done readily in this region also, and so, in comparison to the conventional apparatus, no electrical elements with wide bandwidth characteristics are necessary and an even wider-bandwidth Fabry-Perot filter and the like can be used, so the manufacturing cost can be reduced.

In addition, with the invention, the specific construction for generating a feedback signal for the optical path length utilizing the chromatic dispersion characteristics of the optical path is presented, so a higher-order mode-locked laser that is stable with respect to the repetition rate can be readily implemented.

With the invention, in an ordinary mode-locked laser wherein the pulse repetition rate is identical to the modulation frequency, it is possible to generate a feedback signal used for optical path length control utilizing the chromatic dispersion characteristics of the optical path, and so, in comparison to the conventional apparatus, no electrical elements with wide bandwidth characteristics are necessary and an even wider-bandwidth Fabry-Perot filter and the like can be used, so the manufacturing cost can be reduced.

With the invention, the specific construction for generating a feedback signal for the optical path length utilizing the chromatic dispersion characteristics of the optical path in an ordinary mode-locked laser is presented, so a higher-order mode-locked laser that is stable with respect to the repetition rate can be readily implemented.

In addition, with the invention, it is possible to control the dispersion of the optical path with compact components.

In addition, with the invention, it is possible to use a commercially available bandpass filter in order to generate an error signal for the feedback circuit used in optical path length control, so a feedback circuit can be built up with inexpensive components.

In addition, with the invention, it is possible to readily adjust the oscillation wavelength of the mode-locked laser to perform stabilization of the optical path length.

What is claimed is:

1. A mode-locked laser apparatus comprising
a mode-locked laser oscillator;
detection means for detecting changes in length of an optical path of said mode-locked laser oscillator through comparison of intensities of spectral components of outputs of said mode-locked laser, where change in optical path length is manifested as changes in spectral envelope due to chromatic dispersion characteristics of the optical path of said mode-locked laser oscillator;
an optical path length controller that controls the length of the optical path of said laser oscillator; and
a feedback circuit that controls said optical path length controller by means of a signal detected by said detection means.

2. A mode-locked laser apparatus comprising:
a mode-locked laser oscillator;
an optical modulator;
a signal generator that drives paid optical modulator with a modulation signal with a constant frequency;
an optical filter;
an optical isolator;
detection means for detecting changes in length of an optical path of said mode-locked laser oscillator through comparison of intensities of spectral components of outputs of said mode-locked laser, where a change in optical path length is manifested as changes in spectral envelope due to chromatic dispersion characteristics of the optical path of said mode-locked laser oscillator;
an amplifier that amplifies an output signal obtained from said detection means;
an optical path length controller that controls the length of the optical path of said laser oscillator; and
a feedback circuit that controls said optical path length controller by means of the output signal amplified by said amplifier.

3. A mode-locked laser apparatus comprising:
a mode-locked laser oscillator;
an optical modulator that modulates light output from said laser oscillator with a modulation signal;
filter means for selecting sidebands equivalent to harmonics of the modulation signal contained in the light modulated by said optical modulator;
detection means for detecting changes in length of an optical path of said mode-locked laser oscillator through comparison of intensities of spectral components of outputs of said mode-locked laser, where change in optical path length is manifested as changes in spectral envelope due to chromatic dispersion characteristics of the optical path of said mode-locked laser oscillator;
an amplifier that amplifies an output signal obtained from said detection means;
an optical path length controller that controls the length of the optical path of said laser oscillator; and
a feedback circuit that controls said optical path length controller by means of the output signal amplified by said amplifier.

4. A mode-locked laser apparatus comprising:
a mode-locked laser oscillator;
an optical modulator that modulates light output from said laser oscillator with a modulation signal;
filter means for selecting sidebands equivalent to harmonics of the modulation signal contained in the light modulated by said optical modulator;
an optical isolator;
detection means for detecting changes in length of an optical path of said mode-locked laser oscillator by utilizing chromatic dispersion characteristics of the optical path;
an amplifier that amplifies an output signal obtained from said detection means;
an optical path length controller that controls the length of the optical path of said laser oscillator;
a feedback circuit that controls said optical path length controller by means of the output signal amplified by said amplifier;
a first construction for extracting from the output light two spectral frequency components at roughly equal distances in frequency from a center frequency of an oscillation spectrum of the output light, one on a long-frequency side and the other on a short-frequency side;
a second construction for using two photodetectors to detect an average intensity of each of the two frequency components extracted by said first construction;
means for deriving an intensity-difference signal for two signals detected by said second construction; and
a third construction for controlling the optical path length controller in accordance with the intensity-difference signal;
wherein a modulation frequency of said optical modulator and a free spectral range of said filter means have relationship of being equal to each other when one of the modulation frequency and the free spectral range is multiplied by one of two mutually prime positive integers K and Q and the other multiplied by the other integer, wherein said filter means has a combination in which the positive integers K and Q are present such that a ratio K/Q is a value below a finesse of a Fabry-Perot filter, and wherein a pulse train is generated at a repetition rate that is K times the modulation frequency.

5. A mode-locked laser apparatus comprising:
a mode-locked laser oscillator;
an optical modulator that modulates light output from said laser oscillator with a modulation signal;
detection means for detecting changes in length of an optical path of said mode-locked laser oscillator through comparison of intensities of spectral components of outputs of said mode-locked laser, where change in optical path length is manifested as changes in spectral envelope due to chromatic dispersion characteristics of the optical path of said mode-locked laser oscillator;
an amplifier that amplifies an output signal obtained from said detection means;
an optical path length controller that controls the length of the optical path of said laser oscillator;
a feedback circuit that controls said optical path length controller by means of the output signal amplified by said amplifier.

6. A mode-locked laser apparatus comprising:
a mode-locked laser oscillator;
an optical modulator that modulates light output from said laser oscillator with a modulation signal;

detection means for detecting changes in length of an optical path of said mode-locked laser oscillator by utilizing chromatic dispersion characteristics of the optical path;

an amplifier that amplifies an output signal obtained from said detection means;

an optical path length controller that controls the length of the optical path of said laser oscillator;

a feedback circuit that controls said optical path length controller by means of the output signal amplified by said amplifier;

a first construction for extracting from the output light two spectral frequency components at roughly equal distances in frequency from a center frequency of an oscillation spectrum of the output light, one on a long-frequency side and the other on a short-frequency side;

a second construction for using two photodetectors to detect an average intensity of each of the two frequency components extracted by said first construction;

means for deriving an intensity-difference signal for two signals detected by said second construction; and a third construction for controlling the optical path length controller in accordance with the intensity-difference signal;

wherein a pulse train is generated at repetition rate that is the same as the modulation frequency.

7. The mode-locked laser apparatus according to claim 1, further comprising dispersion control means included in the optical path, dispersion characteristics of which are to be detected.

8. The mode-locked laser apparatus according to claim 2, further comprising dispersion control means included in the optical path, dispersion characteristics of which are to be detected.

9. The mode-locked laser apparatus according to claim 3, further comprising dispersion control means included in the optical path, dispersion characteristics of which are to be detected.

10. The mode-locked laser apparatus according to claim 4, further comprising dispersion control means included in the optical path, dispersion characteristics of which are to be detected.

11. The mode-locked laser apparatus according to claim 5, further comprising dispersion control means included in the optical path, dispersion characteristics of which are to be detected.

12. The mode-locked laser apparatus according to claim 6, further comprising dispersion control means included in the optical path, dispersion characteristics of which are to be detected.

13. The mode-locked laser apparatus according to claim 7, wherein said dispersion control means is a section of an optical fiber with appropriate dispersion and length.

14. The mode-locked laser apparatus according to claim 8, wherein said dispersion control means is a section of an optical fiber with appropriate dispersion and length.

15. The mode-locked laser apparatus according to claim 9, wherein said dispersion control means is a section of an optical fiber with appropriate dispersion and length.

16. The mode-locked laser apparatus according to claim 10, wherein said dispersion control means is a section of an optical fiber with appropriate dispersion and length.

17. The mode-locked laser apparatus according to claim 11, wherein said dispersion control means is a section of an optical fiber with appropriate dispersion and length.

18. The mode-locked laser apparatus according to claim 12, wherein said dispersion control means is a section of an optical fiber with appropriate dispersion and length.

19. The mode-locked laser apparatus according to claim 7, wherein said dispersion control means is a chirped fiber Bragg grating.

20. The mode-locked laser apparatus according to claim 8, wherein said dispersion control means is a chirped fiber Bragg grating.

21. The mode-locked laser apparatus according to claim 9, wherein said dispersion control means is a chirped fiber Bragg grating.

22. The mode-locked laser apparatus according to claim 10, wherein said dispersion control means is a chirped fiber Bragg grating.

23. The mode-locked laser apparatus according to claim 17, wherein said dispersion control means is a chirped fiber Bragg grating.

24. The mode-locked laser apparatus according to claim 18, wherein said dispersion control means is a chirped fiber Bragg grating.

25. The mode-locked laser apparatus according to claim 4, wherein said first construction consists of two bandpass filters.

26. The mode-locked laser apparatus according to claim 6, wherein said first construction consists of two bandpass filters.

27. The mode-locked laser apparatus according to claim 10, wherein said first construction consists of two bandpass filters.

28. The mode-locked laser apparatus according to claim 12, wherein said first construction consists of two bandpass filters.

29. The mode-locked laser apparatus according to claim 16, wherein said first construction consists of two bandpass filters.

30. The mode-locked laser apparatus according to claim 18, wherein said first construction consists of two bandpass filters.

31. The mode-locked laser apparatus according to claim 25, wherein the two bandpass filters each have variable filter characteristics, and comprise means of varying their respective filter characteristics before or during the use of the mode-locked laser apparatus in order to maintain a predetermined relationship among the filter characteristics.

32. The mode-locked laser apparatus according to claim 26, wherein the two bandpass filters each have variable filter characteristics, and comprise means of varying their respective filter characteristics before or during the use of the mode-locked laser apparatus in order to maintain a predetermined relationship among the filter characteristics.

33. The mode-locked laser apparatus according to claim 27, wherein the two bandpass filters each have variable filter characteristics, and comprise means of varying their respective filter characteristics before or during the use of the mode-locked laser apparatus in order to maintain a predetermined relationship among the filter characteristics.

34. The mode-locked laser apparatus according to claim 28, wherein the two bandpass filters each have variable filter characteristics, and comprise means of varying their respective filter characteristics before or during the use of the mode-locked laser apparatus in order to maintain a predetermined relationship among the filter characteristics.

35. The mode-locked laser apparatus according to claim 29, wherein the two bandpass filters each have variable filter characteristics, and comprise means of varying their respective filter characteristics before or during the use of the mode-locked laser apparatus in order to maintain a predetermined relationship among the filter characteristics.

36. The mode-locked laser apparatus according to claim 30, wherein the two bandpass filters each have variable filter characteristics, and comprise means of varying their respective filter characteristics before or during the use of the mode-locked laser apparatus in order to maintain a predetermined relationship among the filter characteristics.

* * * * *